(12) United States Patent
Huston et al.

(10) Patent No.: US 10,600,235 B2
(45) Date of Patent: Mar. 24, 2020

(54) SYSTEM AND METHOD FOR CAPTURING AND SHARING A LOCATION BASED EXPERIENCE

(71) Applicants: Charles D. Huston, Austin, TX (US); Chris Coleman, Austin, TX (US)

(72) Inventors: Charles D. Huston, Austin, TX (US); Chris Coleman, Austin, TX (US)

(*) Notice: Subject to any disclaimer, the term of this patent is extended or adjusted under 35 U.S.C. 154(b) by 0 days.

(21) Appl. No.: 15/847,148

(22) Filed: Dec. 19, 2017

(65) Prior Publication Data

US 2018/0108172 A1    Apr. 19, 2018

Related U.S. Application Data

(63) Continuation-in-part of application No. 13/774,710, filed on Feb. 22, 2013, now abandoned.
(Continued)

(51) Int. Cl.
| | |
|---|---|
| G06T 15/20 | (2011.01) |
| G06Q 50/00 | (2012.01) |
| G06T 7/55 | (2017.01) |
| G06Q 30/02 | (2012.01) |
| G06T 19/00 | (2011.01) |
| G06T 7/521 | (2017.01) |

(52) U.S. Cl.
CPC ....... *G06T 15/205* (2013.01); *G06Q 30/0255* (2013.01); *G06Q 30/0277* (2013.01); *G06Q 50/01* (2013.01); *G06T 7/521* (2017.01); *G06T 7/55* (2017.01); *G06T 19/003* (2013.01); *G06T 19/006* (2013.01)

(58) Field of Classification Search
CPC ....... G06T 15/205; G06T 19/006; G06T 7/55; G06T 19/003
See application file for complete search history.

(56) References Cited

U.S. PATENT DOCUMENTS

| | | | |
|---|---|---|---|
| 5,323,322 A | 6/1994 | Mueller et al. | |
| 6,317,127 B1 | 11/2001 | Daily et al. | |

(Continued)

FOREIGN PATENT DOCUMENTS

| | | |
|---|---|---|
| WO | 2007/043036 | 4/2007 |
| WO | 2012/002811 | 1/2012 |

OTHER PUBLICATIONS

"Blom3D Whitepaper," Apr. 2011, 14 pages.
(Continued)

*Primary Examiner* — Terrell M Robinson
(74) *Attorney, Agent, or Firm* — Egan, Peterman, Enders & Huston

(57) ABSTRACT

A system and method for capturing a location based experience at an event including a plurality of mobile devices having a camera employed near a point of interest to capture random, crowdsourced images and associated metadata near said point of interest. In a preferred form, the images include depth camera information from prepositioned devices around the point of interest during the event. A network communicates images, depth information, and metadata to build a 3D model of the region, preferably with the location of contributors known. Users connect to this experience platform to view the 3D model from a user selected location and orientation and to participate in experiences with, for example, a social network.

33 Claims, 18 Drawing Sheets

Related U.S. Application Data

(60) Provisional application No. 61/602,390, filed on Feb. 23, 2012.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 6,711,293 B1 | 3/2004 | Lowe |
| 6,903,745 B2 | 6/2005 | Takano et al. |
| 6,903,752 B2 | 6/2005 | Ebersole et al. |
| 6,915,008 B2 | 7/2005 | Barman et al. |
| 6,919,867 B2 | 7/2005 | Sauer |
| 6,945,869 B2 | 9/2005 | Kim et al. |
| 7,002,551 B2 | 2/2006 | Azuma et al. |
| 7,046,214 B2 | 5/2006 | Ebersole, Jr. et al. |
| 7,095,401 B2 | 8/2006 | Liu et al. |
| 7,133,054 B2 | 11/2006 | Aguera y Arcas |
| 7,167,576 B2 | 1/2007 | Steenburgh et al. |
| 7,254,271 B2 | 8/2007 | Aguera y Arcas |
| 7,433,024 B2 | 10/2008 | Garcia et al. |
| 7,468,694 B2 | 12/2008 | Shoarinejad |
| 7,499,079 B2 | 3/2009 | Evans, Jr. et al. |
| 7,518,501 B2 | 4/2009 | Huston |
| 7,692,684 B2 | 4/2010 | Ku et al. |
| 7,711,480 B2 | 5/2010 | Robbins |
| 7,734,116 B2 | 6/2010 | Panabaker et al. |
| 7,855,638 B2 | 12/2010 | Huston |
| 7,904,096 B2 | 3/2011 | Shyr et al. |
| 7,982,667 B2 | 7/2011 | Vollath et al. |
| 7,991,283 B2 | 8/2011 | Chen et al. |
| 7,992,104 B2 | 8/2011 | Weir et al. |
| 8,031,933 B2 | 10/2011 | Se et al. |
| 8,044,996 B2 | 10/2011 | Rice et al. |
| 8,046,691 B2 | 10/2011 | Sankar et al. |
| 8,050,461 B2 | 11/2011 | Shpunt et al. |
| 8,265,478 B1 | 9/2012 | Georgiev |
| 8,279,325 B2 | 10/2012 | Pitts et al. |
| 8,279,334 B2 | 10/2012 | Nilson et al. |
| 8,289,440 B2 | 10/2012 | Knight et al. |
| 8,305,456 B1 | 11/2012 | McMahon |
| 8,339,394 B1 * | 12/2012 | Lininger ............... G06T 15/04 345/419 |
| 8,350,847 B2 | 1/2013 | Shpunt |
| 2002/0015024 A1 | 2/2002 | Westerman et al. |
| 2002/0118880 A1 | 8/2002 | Liu et al. |
| 2006/0267982 A1 | 11/2006 | Aguera y Arcas |
| 2007/0018880 A1 | 1/2007 | Huston |
| 2007/0047101 A1 | 3/2007 | Aguera y Arcas |
| 2007/0047102 A1 | 3/2007 | Aguera y Arcas |
| 2007/0104378 A1 | 5/2007 | Aguera y Arcas |
| 2008/0050024 A1 | 2/2008 | Aguera y Arcas |
| 2008/0079802 A1 | 4/2008 | Nilson et al. |
| 2008/0147730 A1 | 6/2008 | Lee et al. |
| 2008/0187305 A1 | 8/2008 | Raskar et al. |
| 2008/0259096 A1 | 10/2008 | Huston |
| 2009/0021576 A1 | 1/2009 | Linder et al. |
| 2009/0096667 A1 | 4/2009 | Shoarinejad |
| 2009/0096783 A1 | 4/2009 | Shpunt et al. |
| 2009/0256904 A1 | 10/2009 | Krill et al. |
| 2009/0296984 A1 * | 12/2009 | Nijim .................. G06K 9/4671 382/103 |
| 2010/0083190 A1 | 4/2010 | Roberts et al. |
| 2010/0153457 A1 | 6/2010 | Grant |
| 2010/0199232 A1 | 8/2010 | Mistry et al. |
| 2010/0208057 A1 | 8/2010 | Meier et al. |
| 2010/0257252 A1 | 10/2010 | Dougherty et al. |
| 2010/0310182 A1 * | 12/2010 | Kroepfl ............. G06K 9/00624 382/216 |
| 2010/0325563 A1 | 12/2010 | Goldthwaite et al. |
| 2011/0035284 A1 | 2/2011 | Moshfeghi |
| 2011/0052006 A1 | 3/2011 | Gurman et al. |
| 2011/0052073 A1 | 3/2011 | Wallace et al. |
| 2011/0069179 A1 | 3/2011 | Bathiche et al. |
| 2011/0069189 A1 | 3/2011 | Venkataraman et al. |
| 2011/0072047 A1 | 3/2011 | Wang et al. |
| 2011/0119587 A1 | 5/2011 | Joy et al. |
| 2011/0137561 A1 | 6/2011 | Kankainen |
| 2011/0141141 A1 | 6/2011 | Kankainen |
| 2011/0173565 A1 | 7/2011 | Ofek et al. |
| 2011/0187746 A1 | 8/2011 | Suto et al. |
| 2011/0199479 A1 | 8/2011 | Waldman |
| 2011/0211737 A1 | 9/2011 | Krupka et al. |
| 2011/0211754 A1 | 9/2011 | Litvak et al. |
| 2011/0225517 A1 | 9/2011 | Goldman et al. |
| 2011/0282799 A1 | 11/2011 | Huston |
| 2011/0283223 A1 | 11/2011 | Vaittinen et al. |
| 2011/0286660 A1 | 11/2011 | Ofek et al. |
| 2011/0310125 A1 | 12/2011 | McEldowney et al. |
| 2011/0312374 A1 | 12/2011 | Chen et al. |
| 2011/0313779 A1 | 12/2011 | Herzog et al. |
| 2011/0319166 A1 | 12/2011 | Bathiche et al. |
| 2012/0007885 A1 | 1/2012 | Huston |
| 2012/0012748 A1 | 1/2012 | Pain et al. |
| 2012/0039525 A1 | 2/2012 | Tian et al. |
| 2012/0042150 A1 | 2/2012 | Saar |
| 2012/0056982 A1 | 3/2012 | Katz et al. |
| 2012/0100895 A1 | 4/2012 | Priyantha et al. |
| 2012/0140109 A1 | 6/2012 | Shpunt et al. |
| 2012/0151055 A1 | 6/2012 | Kansai et al. |
| 2012/0194644 A1 * | 8/2012 | Newcombe ............... G06T 7/74 348/46 |
| 2012/0223885 A1 | 9/2012 | Perez |
| 2012/0299920 A1 * | 11/2012 | Coombe ................. G06T 19/00 345/423 |
| 2012/0307075 A1 | 12/2012 | Margalit |
| 2015/0154798 A1 * | 6/2015 | Simpson ............... G06T 19/003 345/419 |

OTHER PUBLICATIONS

Liu et al., "Multiview Geometry for Texture Mapping 2D Images Onto 3D Range Data," Computer Vision and Pattern Recognition, 2006, pp. 2293-2300.

Lytro User Manual, © 2012 Lytro, Inc., 25 pages.

Mastin et al., "Automatic Registration of LIDAR and Optical Images of Urban Scenes," © 2009 IEEE, pp. 2639-2646.

Snavely et al., "Photo Tourism: Exploring Photo Collections in 3D," Siggraph Conference Proceedings, vol. 25, No. 3, 2006, pp. 835-846.

El-Hakim et al., "Detailed 3D Reconstruction of Large Scale Heritage Sites with Integrated Techniques," IEEE Computer Graphics & Applications, vol. 24, No. 3, 2004, pp. 21-28.

Leberl, "Human Habitat Data in 3D for the Internet," Networked Digital Technologies, 2010, vol. 68, pp. 3-17.

International Search Report & Written Opinion dated Dec. 18, 2014 for PCT/US2013/027443.

Huston et al., U.S. Appl. No. 13/774,710, filed Feb. 22, 2013, Examiner Answer mailed Nov. 18, 2015, 41 pgs.

Office Action dated Oct. 28, 2014 for U.S. Appl. No. 13/774,710.

Final Office Action dated Apr. 23, 2015 for U.S. Appl. No. 13/774,710.

Tuite et al., "PhotoCity: Training Experts at Large-scale Image Acquisition Through a Competitive Game," Proceedings of the SIGCHI Conference on Human Factors in Computing Systems, May 2011, pp. 1383-1392.

\* cited by examiner

FIG. 12

| Tag | Value |
|---|---|
| Manufacturer | CASIO |
| Model | QV-4000 |
| Orientation (rotation) | top - left [8 possible values[17]] |
| Software | Ver1.01 |
| Date and Time | 2003:08:11 16:45:32 |
| YCbCr Positioning | centered |
| Compression | JPEG compression |
| x-Resolution | 72.00 |
| y-Resolution | 72.00 |
| Resolution Unit | Inch |
| Exposure Time | 1/659 sec. |
| FNumber | f/4.0 |
| Exposure Program | Normal program |
| Exif Version | Exif Version 2.1 |
| Date and Time (oritinal) | 2003:08:11 16:45:32 |
| Date and Time (digitized) | 2003:08:11 16:45:32 |
| Components Configuration | Y Cb Cr - |
| Compressed Bits per Pixel | 4.01 |
| Exposure Bias | 0.0 |
| Max Aperture Value | 2.00 |
| Metering Mode | Pattern |
| Flash | Flash did not fire. |
| Focal Length | 20.1 mm |
| Maker Note | 432 bytes unknown data |
| FlashPixVersion | FlashPix Version 1.0 |
| Color Space | sRGB |
| PixelXDimension | 2240 |
| PixelYDimension | 1680 |
| File Source | DSC |
| Interoperability Index | R98 |
| Interoperability Version | (null) |

SYSTEM AND METHOD FOR CAPTURING AND SHARING A LOCATION BASED EXPERIENCE

PRIORITY

The present application is a continuation from U.S. Ser. No. 13/774,710 filed Feb. 22, 2013 which claims priority to U.S. 61/602,390 filed Feb. 23, 2012.

BACKGROUND

1. Field of the Invention

The present invention relates to systems and methods for creating indoor and outdoor environments that include virtual models and images, and methods and systems for using such created environments. In preferred forms, the environments are created in part using crowd sourced images and metadata and the environments are applied to social media applications.

2. Description of the Related Art

Microsoft, Google, and Nokia (Navteq) have employed moving street vehicles through most major cities in the world to capture images of the buildings and environment as the vehicle traverses the street. In some cases, laser radar imagery (e.g. Light Detection and Ranging or "LIDAR") also captures ranging data from the vehicle to capture data related to building and street positions and structure, such as a building height. The images captured by the moving vehicle comprise photographs and video images that users can access from a mapping service (along with satellite images in many cases). For example, Street View from Google is accessed from Google Maps and Google Earth and provides panorama images taken from the acquisition vehicle as it moves along major streets. Bing Maps from Microsoft is similar, see, e.g., U.S. Publication No. 2011/0173565 and WO 2012/002811. Earthmine is similar but uses the Mars collection system. Nokia has its own version called "Journey View" which operates similarly. Such imagery are very useful, but acquisition is limited to dedicated vehicles traveling along major arteries. Other approaches use optical and LIDAR data captured from an aircraft.

Photo sharing sites have arisen where web based photo repositories (Photobucket) share photos of an event with authorized users. Examples include Flickr, Photobucket, Picasa, Shutterfly, Beamr and Snapfish. Further, social networks such as Facebook and Google+ allow groups to post photos of an event and share photographs with friends. Such photo repositories and social networks are useful in sharing an event with friends, but are limited in realism and interaction. Further, many social networks operate as photo repositories and traditional photo repositories have become social networks—blurring the distinction between them. Further, photo improvement sites have become common. For example, Instagram, Camera+, and Pinterest.

There is a need for an accurate method and system to create an environment and to update an environment so that it is accurate, feature rich, and current. For example, U.S. Publication No. 2011/0313779 illustrates one approach to update points of interest by collecting user feedback. Additionally, many environments are simply not available, such as parks, indoor locations and any locations beyond major streets in major cities. Further, it would be an advance to be able to share location based experiences beyond just photos of an event posted after the event.

Related patents and applications describe various improvements on location based experiences, for example: U.S. Pat. Nos. 7,855,638 and 7,518,501 and U.S. Publication Nos. 2011/0282799, 2007/0018880, 2012/0007885, and 2008/0259096 (sometimes referred to herein as "Related Patents"). All references cited herein are incorporated by reference to the maximum extent allowable by law, but such incorporation should not be construed as an admission that a reference is prior art.

SUMMARY

The problems outlined above are addressed by the systems and methods for creating and sharing an environment and an experience in accordance with the present invention. Broadly speaking, a system for creating an environment and for sharing an experience includes a plurality of mobile devices having a camera employed near a point of interest to capture random images and associated metadata near said point of interest, wherein the metadata for each image includes location of the mobile device and the orientation of the camera. A wireless network communicates with the mobile devices to accept the images and metadata. An image processing server is connected to the network for receiving the images and metadata, with the server processing the images to determine the location of various targets in the images and to build a 3D model of the region near the point of interest. Preferably, an experience platform connected to the image processing server for storing the 3D model. A plurality of users connect to the experience platform to view the point of interest from a user selected location and orientation.

In a preferred form, the experience platform includes a plurality of images associated with locations near the point of interest. In another form the users connected to the experience platform can view images associated with a user selected location and orientation. In another form, the processing server stitches a number of images together to form a panorama. Preferably, the users connected to the experience platform can view panoramas associated with a user selected location and orientation.

Broadly speaking, a system for creating an environment for use with a location based experience includes a plurality of mobile devices accompanying a number of random contributors, each having a camera to capture random images and associated metadata near a point of interest, wherein the metadata for each image includes location of the mobile device and the orientation of the camera. The system includes a wireless network communicating with the mobile devices to accept the images and metadata. An image processing server is connected to the network for receiving the images and metadata, wherein the server processes the images to determine the location of various targets in the images and to build a 3D model of the region near the point of interest. Preferably the server processes the images to create panoramas associated with a number of locations near the point of interest.

In one form the present invention includes a method of sharing content in a location based experience, where a plurality of images and associated metadata are captured. The images and metadata are processed to build a 3D model of the region near a point of interest. The method includes storing the images and 3D model in an experience platform connected to a network. The experience platform is accessed using the network to access the 3D model and images. A user selects a location and orientation in the 3D model and views the point of interest from the selected location and orientation.

In another form, sharing an experience or viewing an event involves adding or changing an advertisement based on context, such as marketing factors. In another form, a product image may be inserted into the view. In other cases, the context of the advertisement or product placement might be determined by the personal information of the individual spectator as gleaned from the spectator's viewing device, social media or cloud based data. In other forms, an advertisement might be added or changed based on the social network tied to an event or experience or the nature of the event.

BRIEF DESCRIPTION OF THE DRAWINGS

FIG. 1b is a plan view of the Plaza of FIG. 1a;

FIG. 12 is a table of EXIF metadata for an acquired image;

DESCRIPTION OF PREFERRED EMBODIMENTS

I. Overview

Figure 1A:
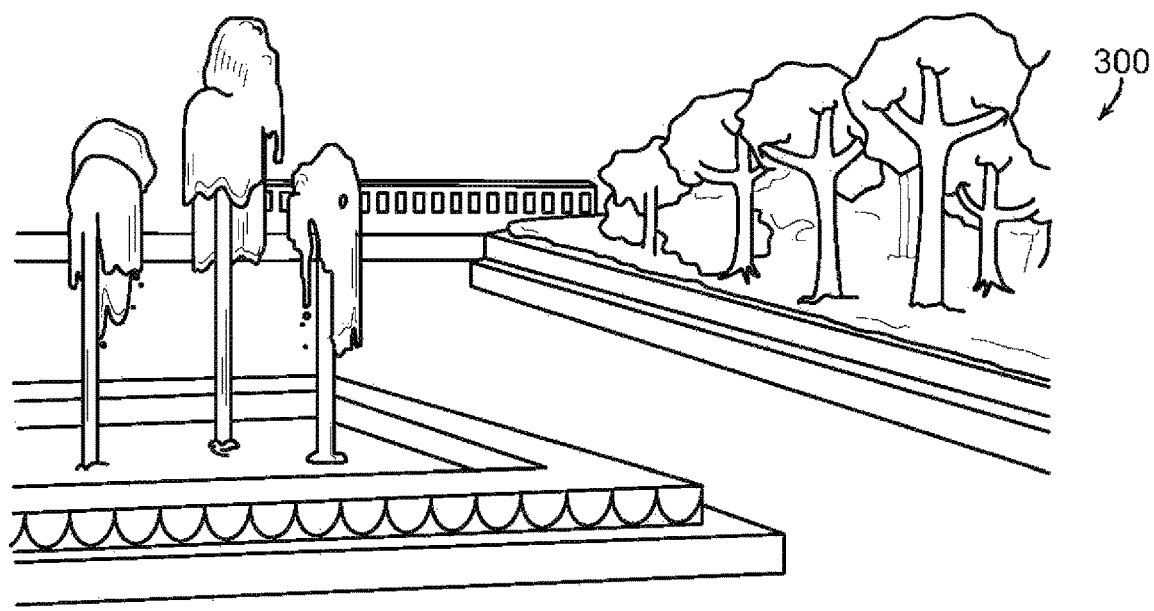
FIG. 1a is a perspective view of a Plaza used as an example herein.
Figure 2:
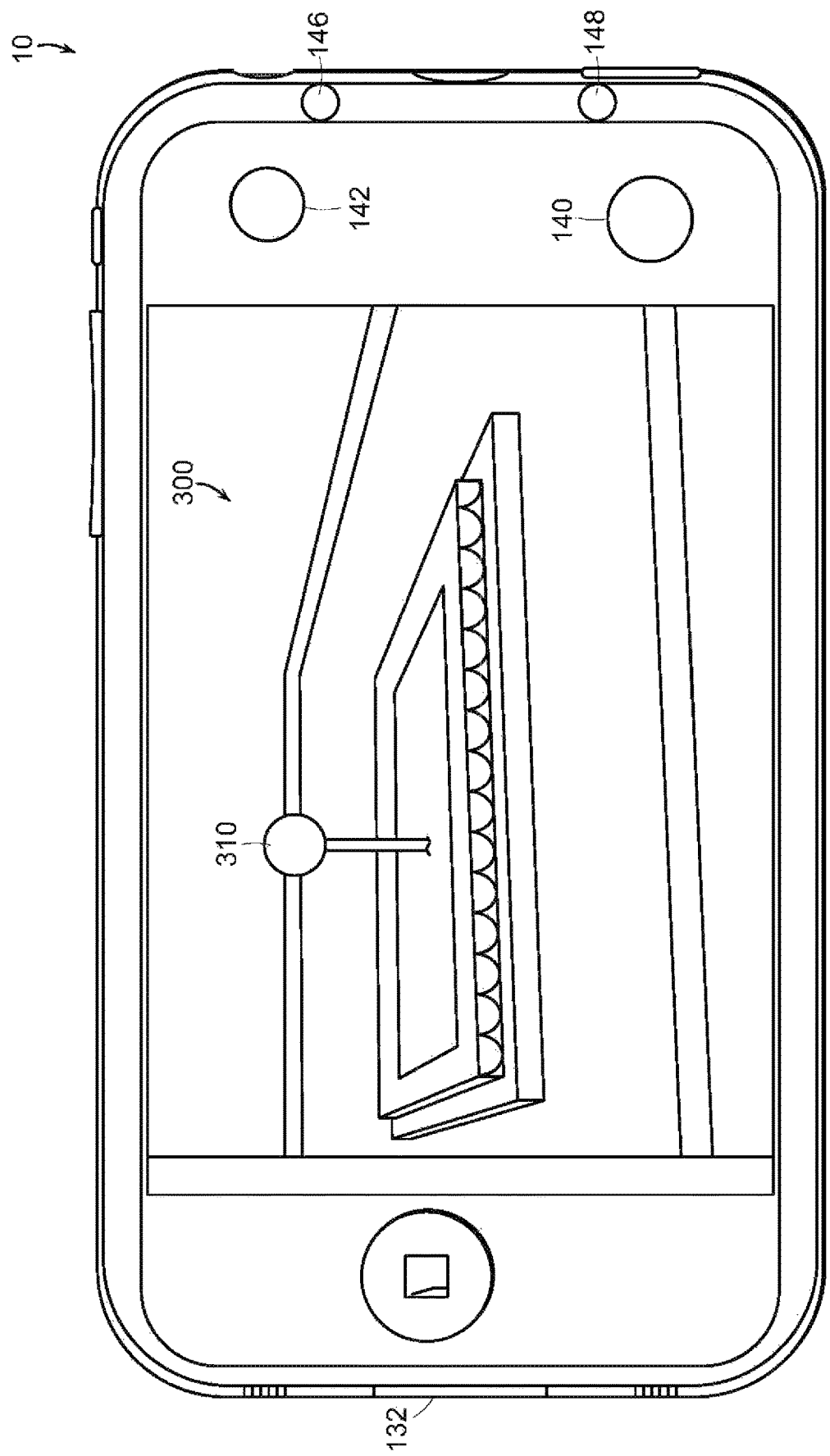
FIG. 2 is a front elevational view of a mobile device in a preferred embodiment.
Figure 3:
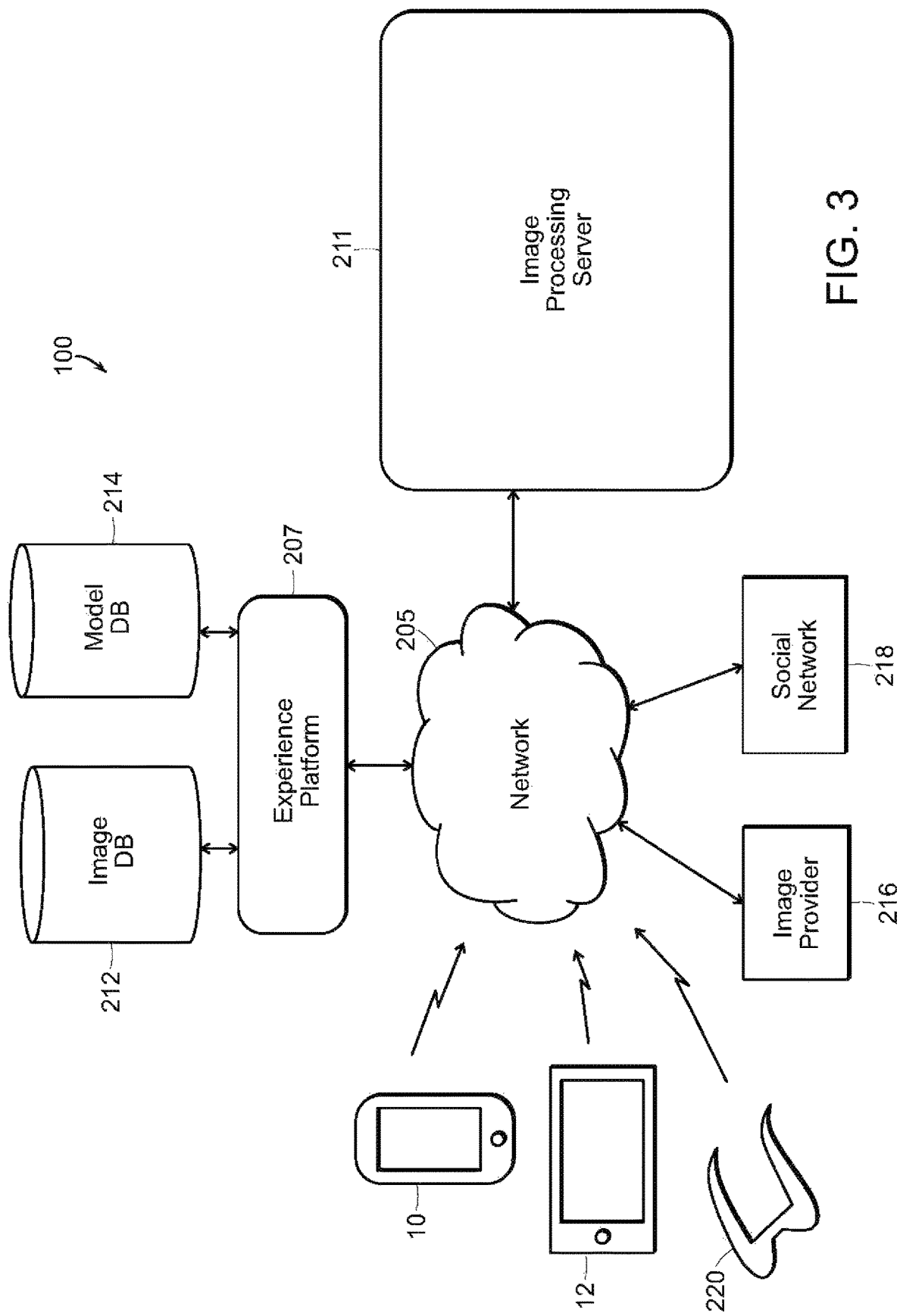
FIG. 3 is a functional diagram of a network system in accordance with the present invention.

In an exemplary form, a 3D model or "virtual model" is used as a starting point, such as the image of the plaza of FIG. 1a. Multiple users (or a single user taking multiple pictures) take pictures (images) of the plaza from various locations, marked A-E in FIG. 1b using a mobile device, such as smart phone 10 shown in FIG. 3. Each image A-E includes not only the image, but metadata associated with the image including EXIF data, time, position, and orientation. In this example, the images and metadata are uploaded as they are acquired to a communication network 205 (e.g., cell network) connected to an image processing server 211 (FIG. 3). In some embodiments, the mobile device also includes one or more depth cameras as shown in FIG. 2.

The image processing server 211 uses the network 205 and GPS information from the phone 10 to process the metadata to obtain very accurate locations for the point of origin of images A-E. Using image matching and registration techniques the images are stitched together to form mosaics and panoramas, and to refine a 3D model of the plaza. In refining the 3D model of the plaza, image recognition techniques may remove people from the images to focus on building a very accurate 3D model of the plaza without clutter and privacy issues. The resulting "environment" is an accurate 3D model of the plaza that can be recreated and viewed from any location in the plaza and user selected orientation from the user-chosen location. Further, many locations in the plaza have images, mosaics or panoramas of stitched images associated with the location or can be created from images associated with nearby locations.

In one example, a user remote from the plaza at the time of an event can participate in the event by accessing the experience platform 207 and viewing the plaza in essentially real time. All or selected participants in the event can be retained in the images, and even avatars employed to represent participants at the event. The remote user, therefore can observe the plaza during the event selecting a virtual view of the plaza or photographic view of the plaza during the event.

In another example, the plaza described above for an event becomes newsworthy for the event. Remote users or a news organization can replay the event using the historical images for the event accessed from the experience platform.

In still another example, a user physically attending the event at the plaza can participate by accessing the experience platform 207 and identifying participants in the event using augmented reality and/or object related content.

II. Explanation of Terms

As used herein, the term "image" refers to one or a series of images taken by a camera (e.g., a still camera, digital camera, video camera, camera phone, etc.) or any other imaging equipment. The image is associated with metadata, such as EXIF, time, location, tilt angle, and orientation of the imaging device (e.g., camera) at the time of image capture. Depth camera information and audio can also be considered an image or part of an image.

As used herein, the term "point of interest" refers to any point in space specified by a user in an image. By way of example, the point of interest in an image can be an observation deck or a roof of a tower, an antenna or a window of a building, a carousel in a park, etc. "Points of interest" are not limited to only stationary objects but can include moving objects as well.

The most common positioning technology is GPS. As used herein, GPS—sometimes known as GNSS—is meant to include all of the current and future positioning systems that include satellites, such as the U.S. Navistar, GLONASS, Galileo, EGNOS, WAAS, MSAS, BeiDou Navigation Satellite System (China), QZSS, etc. The accuracy of the positions, particularly of the participants, can be improved using known techniques, often called differential techniques, such as WAAS (wide area), LAAS (local area), Carrier-Phase Enhancement (CPGPS), Space Based Augmentation Systems (SBAS); Wide Area GPS Enhancement (WAGE), or Relative Kinematic Positioning (RKP). Even without differential correction, numerous improvements are increasing GPS accuracy, such as the increase in the satellite constellation, multiple frequencies ($L_1$, $L_2$, $L_5$), modeling and AGPS improvements, software receivers, and ground station improvements. Of course, the positional degree of accuracy is driven by the requirements of the application. In the golf example used to illustrate a preferred embodiment, sub five meter accuracy provided by WAAS with Assisted GPS would normally be acceptable. In building a model in accordance with the present invention, AGPS, WAAS, and post processing using time and differential correction can result in submeter position accuracy. Further, some "experiences" might be held indoors and the same message enhancement techniques described herein used. Such indoor positioning systems include AGPS, IMEO, Wi-Fi (Skyhook), WIFISLAM, Cell ID, pseudolites, repeaters, RSS on any electromagnetic signal (e.g. TV) and others known or developed.

The term "geo-referenced" means a message fixed to a particular location or object. Thus, the message might be fixed to a venue location, e.g., golf course fence or fixed to a moving participant, e.g., a moving golf car or player. An object is typically geo-referenced using either a positioning technology, such as GPS, but can also be geo-referenced using machine vision. If machine vision is used (i.e. object recognition), applications can be "markerless" or use "markers," sometimes known as "fiducials." Marker-based augmented reality often uses a square marker with a high contrast. In this case, four corner points of a square are detected by machine vision using the square marker and three-dimensional camera information is computed using this information. Other detectable sources have also been used, such as embedded LED's or special coatings or QR codes. Applying AR to a marker which is easily detected is advantageous in that recognition and tracking are relatively accurate, even if performed in real time. So, in applications where precise registration of the AR message in the background environment is important, a marker based system has some advantages.

In a "markerless" system, AR uses a general natural image instead of a fiducial. In general, markerless AR uses a feature point matching method. Feature point matching refers to an operation for searching for and connecting the same feature points in two different images. One method for feature recognition is discussed herein in connection with Photsyth. A method for extracting a plane uses Simultaneous Localization and Map-building (SLAM)/Parallel Tracking And Mapping (PTAM) algorithm for tracking three-dimensional positional information of a camera and three-dimensional positional information of feature points in real time and providing AR using the plane has been suggested. However, since the SLAM/PTAM algorithm acquires the image to search for the feature points, computes the three-dimensional position of the camera and the three-dimensional positions of the feature points, and provides AR based on such information, a considerable computation is necessary. A hybrid system can also be used where a readily recognized symbol or brand is geo-referenced and machine vision substitutes the AR message.

In the present application, the term "social network" is used to refer to any process or system that tracks and enables connections between members (including people, businesses, and other entities) or subsets of members. The connections and membership may be static or dynamic and the membership can include various subsets within a social network. For example, a person's social network might include a subset of members interested in art and the person shares an outing to a sculpture garden only with the art interest subset. Further, a social network might be dynamically configured. For example, a social network could be formed for "Nasher Sculpture Garden" for September 22 and anyone interested could join the Nasher Sculpture Garden September 22 social network. Alternatively, anyone within a certain range of the event might be permitted to join. The permutations involving membership in a social network are many and not intended to be limiting.

A social network that tracks and enables the interactive web by engaging users to participate in, comment on and create content as a means of communicating with their social graph, other users and the public. In the context of the present invention, such sharing and social network participation includes participant created content and spectator created content and of course, jointly created content. For example, the created content can be interactive to allow spectators to add content to the participant created event. The distinction between photo repositories, such as FLIKR and Photobucket and social networks has become blurred, and the two terms are sometimes used interchangeably herein.

Examples of conventional social networks include LinkedIn.com or Facebook.com, Google Plus, Twitter (including Tweetdeck), social browsers such as Rockmelt, and various social utilities to support social interactions including integrations with HTML5 browsers. The website located at www.Wikipedia.org/wiki/list_of_social_networking-_sites lists several hundred social networks in current use. Dating sites, Listservs, and Interest groups can also serve as a social network. Interest groups or subsets of a social network are particularly useful for inviting members to attend an event, such as Google+ "circles" or Facebook "groups." Individuals can build private social networks. Conventional social networking websites allow members to communicate more efficiently information that is relevant to their friends or other connections in the social network. Social networks typically incorporate a system for maintaining connections among members in the social network and links to content that is likely to be relevant to the members. Social networks also collect and maintain information or it may be dynamic, such as tracking a member's actions within the social network. The methods and system hereof relate to dynamic events of a member's actions shared within a social network about the members of the social network. This information may be static, such as geographic location, employer, job type, age, music preferences, interests, and a variety of other attributes, In the present application, the venue for an event or "experience" can be a real view or depicted as a photo background environment or a virtual environment, or a mixture, sometimes referred to as "mixed reality." A convenient way of understanding the environment of the present invention is as a layer of artificial reality or "augmented reality" images overlaid the event venue background. There are different methods of creating the event venue background as understood by one of ordinary skill in the art. For example, an artificial background environment can be created by a number of rendering engines, sometimes known as a "virtual" environment. See, e.g., Nokia's (through its Navteq subsidiary) Journey View which blends digital images of a real environment with an artificial 3D rendering. A "virtual" environment or 3D model can be at different levels of resolutions, such as that shown in FIGS. A-11D. A real environment can be the background as seen through glasses of FIG. 10, but can also be created using a digital image, panorama or 3D model. Such a digital image can be stored and retrieved for use, such as a "street view" or photo, video, or panorama, or other type of stored image. Alternatively, many mobile devices have a camera for capturing a digital image which can be used as the background environment. Such a camera-sourced digital image may come from the user, friends, social network groups, crowd-sourced, or service provided. Because the use of a real environment as the background is common, "augmented reality" often refers to a technology of inserting a virtual reality graphic (object) into an actual digital image and generating an image in which a real object and a virtual object are mixed (i.e. "mixed reality"). Augmented reality is often characterized in that supplementary information using a virtual graphic may be layered or provided onto an image acquired of the real world. Multiple layers of real and virtual reality can be mixed. In such applications the placement of an object or "registration" with other layers is important. That is, the position of objects or layers relative to each other based on a positioning system should be close enough to support the application. As used herein, "artificial reality" ("AR") is sometimes used interchangeably with "virtual," "mixed," or "augmented" reality, it being understood that the background environment can be real or virtual.

The present application uses the terms "platform" and "server" interchangeably and describes various functions associated with such a server, including data and applications residing on the server. Such functional descriptions does not imply that all functions could not reside on the same server or multiple servers or remote and distributed servers, or even functions shared between clients and servers as readily understood in the art.

The present application uses the term "random" when discussing an image to infer that the acquisition of multiple images is not coordinated, i.e. target, orientation, time, etc. One category of acquired random images is from "crowd-sourcing."

In the present application, the term "message" is used to encompass any artificial reality or virtual object, such as distance messages, advertisements, other facts, targets, shot distribution diagrams, event information, warnings, announcements and other types of alpha numeric displays. However, the message could also be a graphic, logo or brand. It shall be understood that other objects or graphics may also be enhanced and the term "message" is understood to include other objects.

III. Mobile Device

Figure 4:
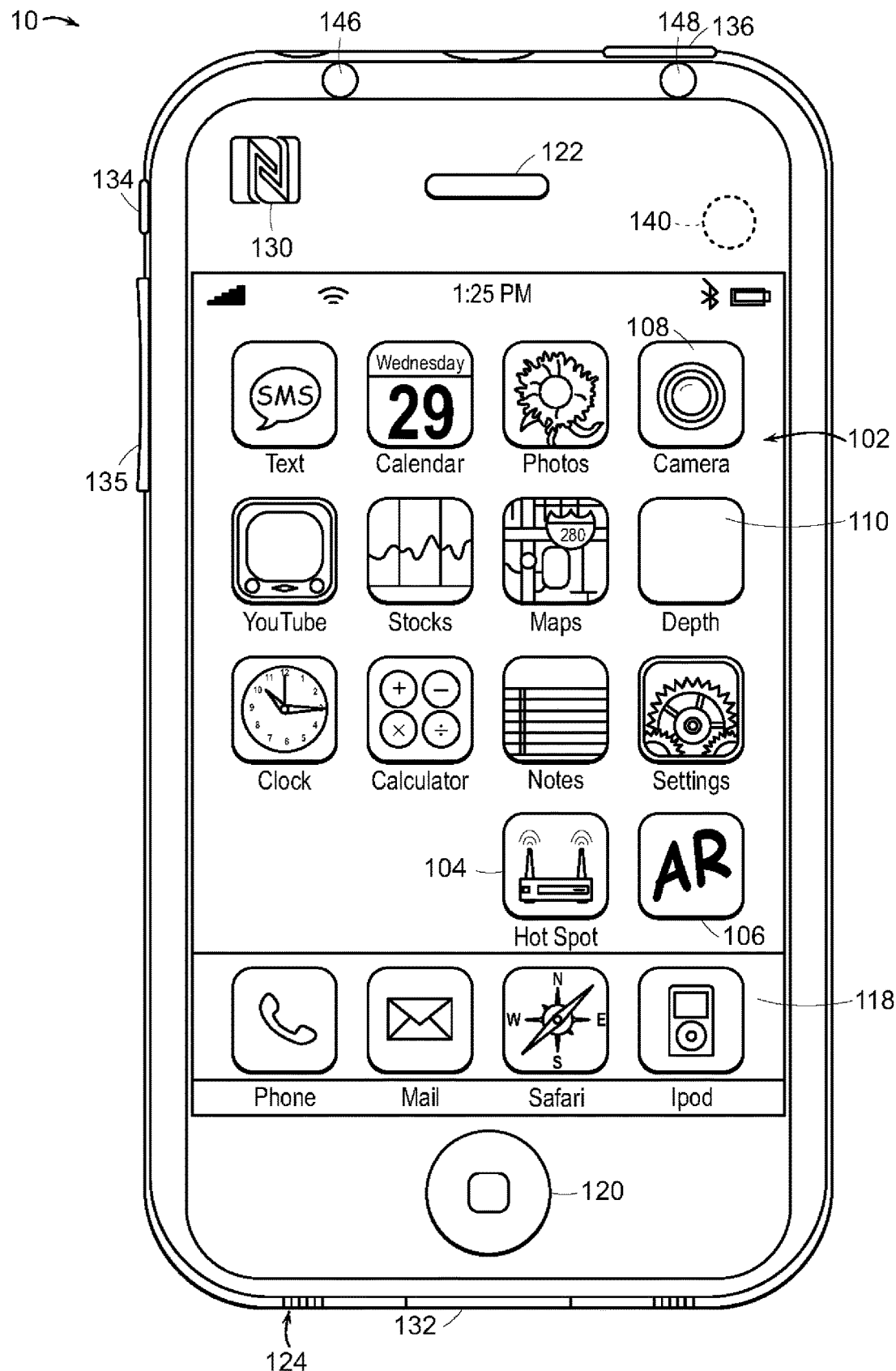
FIG. 4 is a front elevational view of the mobile device of FIG. 2 depicting functional objects.

In more detail, FIG. 4 is a front elevational view of a mobile device 10, such as a smart phone, which is the preferred form factor for the device 10 discussed herein to illustrate certain aspects of the present invention. Mobile device 10 can be, for example, a handheld computer, a tablet computer, a personal digital assistant, goggles or glasses, contact lens, a cellular telephone, a wrist-mounted computer, a camera having a GPS and a radio, a GPS with a radio, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing.

Mobile device 10 includes a touch-sensitive graphics display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

The touch-sensitive graphics display 102 can comprise a multi-touch-sensitive display. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. An example of a multi-touch-sensitive display technology is described in U.S. Pat. Nos. 6,323,846; 6,570,557; 6,677,932; and U.S. Publication No. 2002/0015024, each of which is incorporated by reference herein in its entirety. Touch screen 102 and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 102.

Mobile device 10 can display one or more graphical user interfaces on the touch-sensitive display 102 for providing the user access to various system objects and for conveying information to the user. The graphical user interface can include one or more display objects 104, 106, 108, 110. Each of the display objects 104, 106, 108, 110 can be a graphic representation of a system object. Some examples of system objects include device functions, applications, windows, files, alerts, events, or other identifiable system objects.

Mobile device 10 can implement multiple device functionalities, such as a telephony device, as indicated by a phone object; an e-mail device, as indicated by the e-mail object; a network data communication device, as indicated by the Web object; a Wi-Fi base station device (not shown); and a media processing device, as indicated by the media player object. For convenience, the device objects, e.g., the phone object, the e-mail object, the Web object, and the media player object, can be displayed in menu bar 118.

Each of the device functionalities can be accessed from a top-level graphical user interface, such as the graphical user interface illustrated in FIG. 4. Touching one of the objects e.g. 104, 106, 108, 110 etc. can, for example, invoke the corresponding functionality. In the illustrated embodiment, object 106 represents an Artificial Reality application in accordance with the present invention. Object 110 enables the functionality of one or more depth cameras.

Upon invocation of particular device functionality, the graphical user interface of mobile device 10 changes, or is augmented or replaced with another user interface or user interface elements, to facilitate user access to particular functions associated with the corresponding device functionality. For example, in response to a user touching the phone object, the graphical user interface of the touch-sensitive display 102 may present display objects related to various phone functions; likewise, touching of the email object may cause the graphical user interface to present display objects related to various e-mail functions; touching the Web object may cause the graphical user interface to present display objects related to various Web-surfing functions; and touching the media player object may cause the graphical user interface to present display objects related to various media processing functions.

The top-level graphical user interface environment or state of FIG. 4 can be restored by pressing button 120 located near the bottom of mobile device 10. Each corresponding device functionality may have corresponding "home" display objects displayed on the touch-sensitive display 102, and the graphical user interface environment of FIG. 4 can be restored by pressing the "home" display object or reset button 120.

The top-level graphical user interface is shown in FIG. 1 and can include additional display objects, such as a short messaging service (SMS) object, a calendar object, a photos object, a camera object 108, a calculator object, a stocks object, a weather object, a maps object, a notes object, a clock object, an address book object, and a settings object, as well as AR object 106 and depth camera object 110. Touching the SMS display object can, for example, invoke an SMS messaging environment and supporting functionality. Likewise, each selection of a display object can invoke a corresponding object environment and functionality.

Mobile device 10 can include one or more input/output (I/O) devices and/or sensor devices. For example, speaker 122 and microphone 124 can be included to facilitate voice-enabled functionalities, such as phone and voice mail functions. In some implementations, loud speaker 122 can be included to facilitate hands-free voice functionalities, such as speaker phone functions. An audio jack can also be included for use of headphones and/or a microphone.

A proximity sensor (not shown) can be included to facilitate the detection of the user positioning mobile device 10 proximate to the user's ear and, in response, disengage the touch-sensitive display 102 to prevent accidental function invocations. In some implementations, the touch-sensitive display 102 can be turned off to conserve additional power when mobile device 10 is proximate to the user's ear.

Other sensors can also be used. For example, an ambient light sensor (not shown) can be utilized to facilitate adjusting the brightness of the touch-sensitive display 102. An accelerometer (FIG. 6) can be utilized to detect movement of mobile device 10, as indicated by the directional arrow. Accordingly, display objects and/or media can be presented according to a detected orientation, e.g., portrait or landscape.

Mobile device 10 may include circuitry and sensors for supporting a location determining capability, such as that provided by the global positioning system (GPS) or other positioning system (e.g., Cell ID, systems using Wi-Fi access points, television signals, cellular grids, Uniform Resource Locators (URLs)). A positioning system (e.g., a GPS receiver, FIG. 6) can be integrated into the mobile device 10 or provided as a separate device that can be coupled to the mobile device 10 through an interface (e.g., port device 132) to provide access to location-based services.

Figure 5:
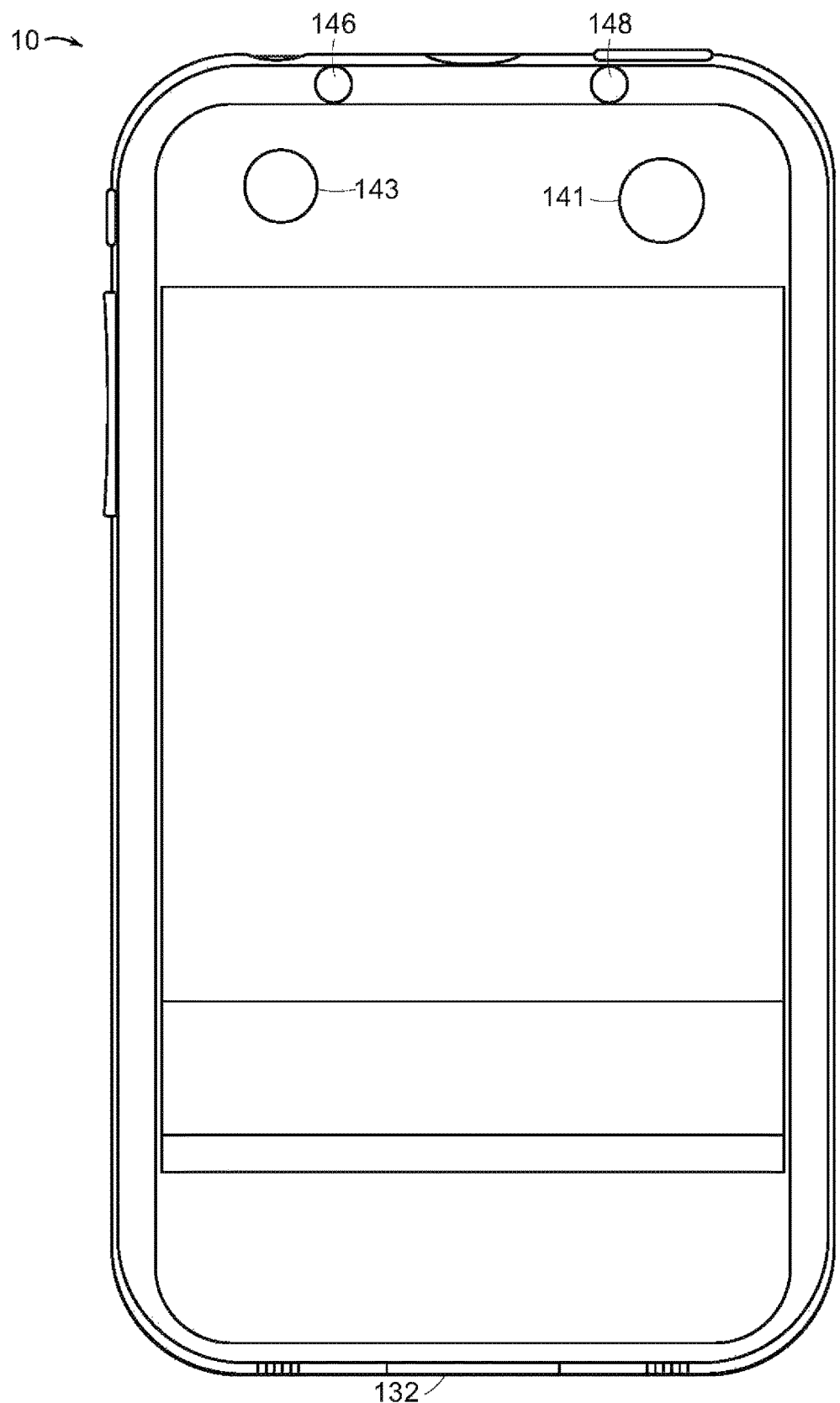
FIG. 5 is a back elevational view of the device of FIGS. 2 and 4.

Mobile device 10 can also include one or more front camera lens and sensor 140 and depth camera 142. In a preferred implementation, a backside camera lens and sensor 141 is located on the back surface of the mobile device 10 as shown in FIG. 5. The conventional RGB cameras 140, 141 can capture still images and/or video. The camera subsystems and optical sensors 140, 141 may comprise, e.g., a charged coupled device (CCD) or a complementary metal-oxide semiconductor (CMOS) optical sensor, can be utilized to facilitate camera functions, such as recording photographs and video clips. Camera controls (zoom, pan, capture and store) can be incorporated into buttons 134-136 (FIG. 4.) In some embodiments, the cameras can be of different types. For example, cameras 140, 141 might be a conventional RGB camera, while cameras 142, 143 comprise a range camera, such as a plenoptic camera. Similarly, other sensors can be incorporated into device 10. For example, sensors 146, 148 might be other types of range cameras, such as a time of flight camera (TOF) or LIDAR with 146 the illuminator and 148 the imager. Alternatively, in several embodiments the sensors are part of a structured light system where sensor 146 is an IR emitter and sensor 148 is an IR receptor that functions as a depth camera, such as Capri 1.25 available from Primesense.

The preferred mobile device 10 includes a GPS positioning system. In this configuration, another positioning system can be provided by a separate device coupled to the mobile device 10, or can be provided internal to the mobile device. Such a positioning system can employ positioning technology including a GPS, a cellular grid, URL's, IMEO, pseudolites, repeaters, Wi-Fi or any other technology for determining the geographic location of a device. The positioning system can employ a service provided by a positioning service such as, for example, a Wi-Fi RSS system from SkyHook Wireless of Boston, Mass., or Rosum Corporation of Mountain View, Calif. In other implementations, the positioning system can be provided by an accelerometer and a compass using dead reckoning techniques starting from a known (e.g. determined by GPS) location. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system can be provided by using wireless signal strength and one or more locations of known wireless signal sources (Wi-Fi, TV, FM) to provide the current location. Wireless signal sources can include access points and/or cellular towers. Other techniques to determine a current location of the mobile device 10 can be used and other configurations of the positioning system are possible.

Mobile device 10 can also include one or more wireless communication subsystems, such as a 802.11b/g/n communication device, and/or a Bluetooth™ communication device, in addition to near field communications. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc. Additional sensors are incorporated into the device 10, such as accelerometer, digital compass and gyroscope, see FIG. 6. A preferred device would include a rangefinder as well. Further, peripheral sensors, devices and subsystems can be coupled to peripherals interface 132 to facilitate multiple functionalities. For example, a motion sensor, a light sensor, and/or a proximity sensor can be coupled to peripherals interface 132 to facilitate the orientation, lighting and proximity functions described with respect to FIGS. 4 and 6. Other sensors can also be connected to peripherals interface 132, such as a GPS receiver, a temperature sensor, a biometric sensor, RFID, or any Depth camera or other sensing device, to facilitate related functionalities. Preferably, the present invention makes use of as many sensors as possible to collect metadata associated with an image. The quantity and quality of metadata aids not only yields better results, but reduces image processing time.

Port device 132, is e.g., a Universal Serial Bus (USB) port, or a docking port, or some other wired port connection. Port device 132 can, for example, be utilized to establish a wired connection to other computing devices, such as other communication devices 10, a personal computer, a printer, or other processing devices capable of receiving and/or transmitting data. In some implementations, port device 132 allows mobile device 10 to synchronize with a host device using one or more protocols.

Figure 6:
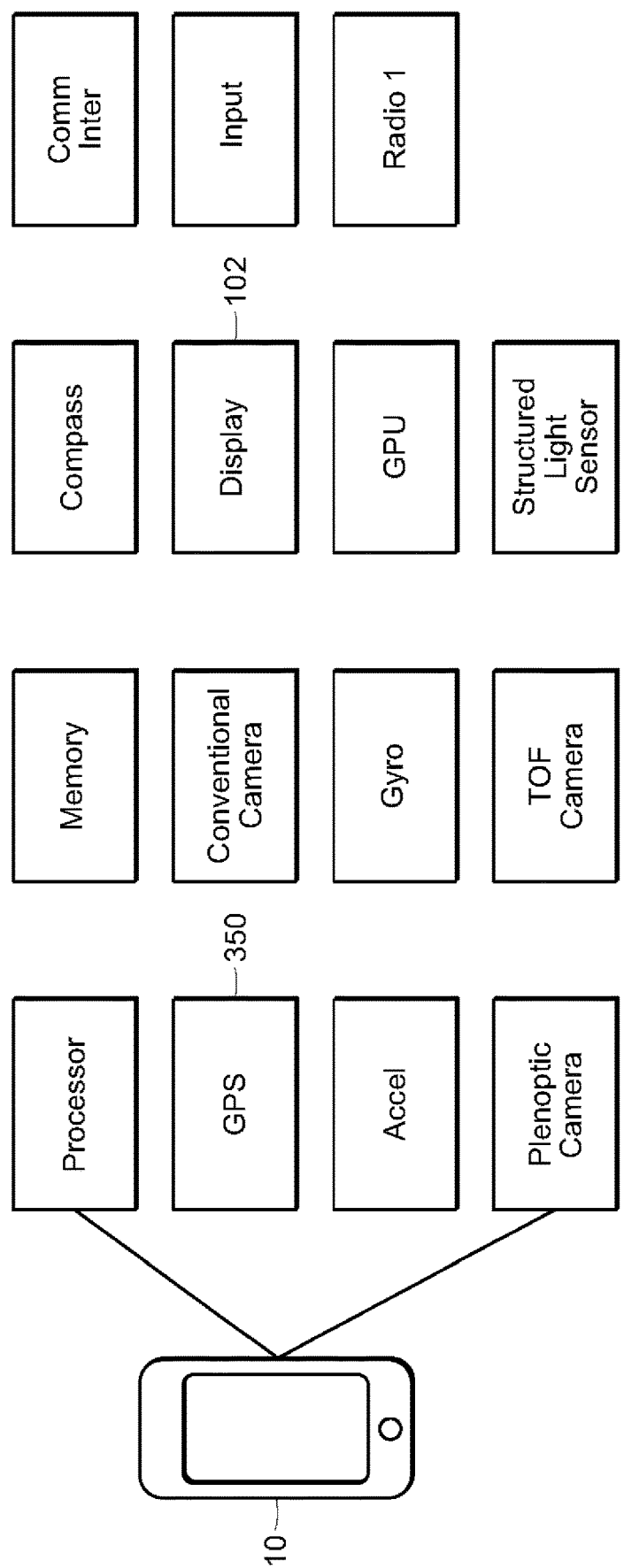
FIG. 6 is a functional hardware diagram of the device of FIGS. 2, 4, and 5.

Input/output and operational buttons are shown at 134-136 to control the operation of device 10 in addition to, or in lieu of the touch sensitive screen 102. Mobile device 10 can include a memory interface to one or more data processors, image processors and/or central processing units, and a peripherals interface (FIG. 6). The memory interface, the one or more processors and/or the peripherals interface can be separate components or can be integrated in one or more integrated circuits. The various components in mobile device 10 can be coupled by one or more communication buses or signal lines.

Preferably, the mobile device includes a graphics processing unit (GPU) coupled to the CPU (FIG. 6). While a Nvidia GeForce GPU is preferred, in part because of the availability of CUDA, any GPU compatible with OpenGL is acceptable. Tools available from Kronos allow for rapid development of 3D models. Of course, a high performance System on a Chip (SOC) is a preferred choice if cost permits, such as an NVIDIA Tegra 4i with 4 CPU cores, 60 GPU cores, and an LTE modem.

The I/O subsystem can include a touch screen controller and/or other input controller(s). The touch-screen controller can be coupled to touch screen 102. The other input controller(s) can be coupled to other input/control devices 132-136, such as one or more buttons, rocker switches, thumb-wheel, infrared port, USB port, and/or a pointer device such as a stylus. The one or more buttons (132-136) can include an up/down button for volume control of speaker 122 and/or microphone 124, or to control operation of cameras 140,141. Further, the buttons (132-136) can be used to "capture" and share an image of the event along with the location of the image capture. Finally, "softkeys" can be used to control a function—such as controls appearing on display 102 for controlling a particular application (AR application 106 for example).

In one implementation, a pressing of button 136 for a first duration may disengage a lock of touch screen 102; and a pressing of the button for a second duration that is longer than the first duration may turn the power on or off to mobile device 10. The user may be able to customize a functionality of one or more of the buttons. Touch screen 102 can, for example, also be used to implement virtual or soft buttons and/or a keyboard.

In some implementations, mobile device 10 can present recorded audio and/or video files, such as MP3, AAC, and MPEG files. In some implementations, mobile device 10 can include the functionality of an MP3 player, such as an iPod™. Mobile device 10 may, therefore, include a 36-pin connector that is compatible with the iPod. Other input/output and control devices can also be used.

The memory interface can be coupled to a memory. The memory can include high-speed random access memory and/or non-volatile memory, such as one or more magnetic disk storage devices, one or more optical storage devices, and/or flash memory (e.g., NAND, NOR). The memory can store an operating system, such as Darwin, RTXC, LINUX, UNIX, OS X, WINDOWS, or an embedded operating system such as VxWorks. The operating system may include instructions for handling basic system services and for performing hardware dependent tasks. In some implementations, the operating system handles timekeeping tasks, including maintaining the date and time (e.g., a clock) on the mobile device 10. In some implementations, the operating system can be a kernel (e.g., UNIX kernel).

The memory may also store communication instructions to facilitate communicating with one or more additional devices, one or more computers and/or one or more servers. The memory may include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GPS/Navigation instructions to facilitate GPS and navigation-related processes and instructions; camera instructions to facilitate camera-related processes and functions; other software instructions to facilitate other related processes and functions; and/or diagnostic instructions to facilitate diagnostic processes and functions. The memory can also store data, including but not limited to coarse information, locations (points of interest), personal profile, documents, images, video files, audio files, and other data. The information can be stored and accessed using known methods, such as a structured or relative database.

Figure 10:
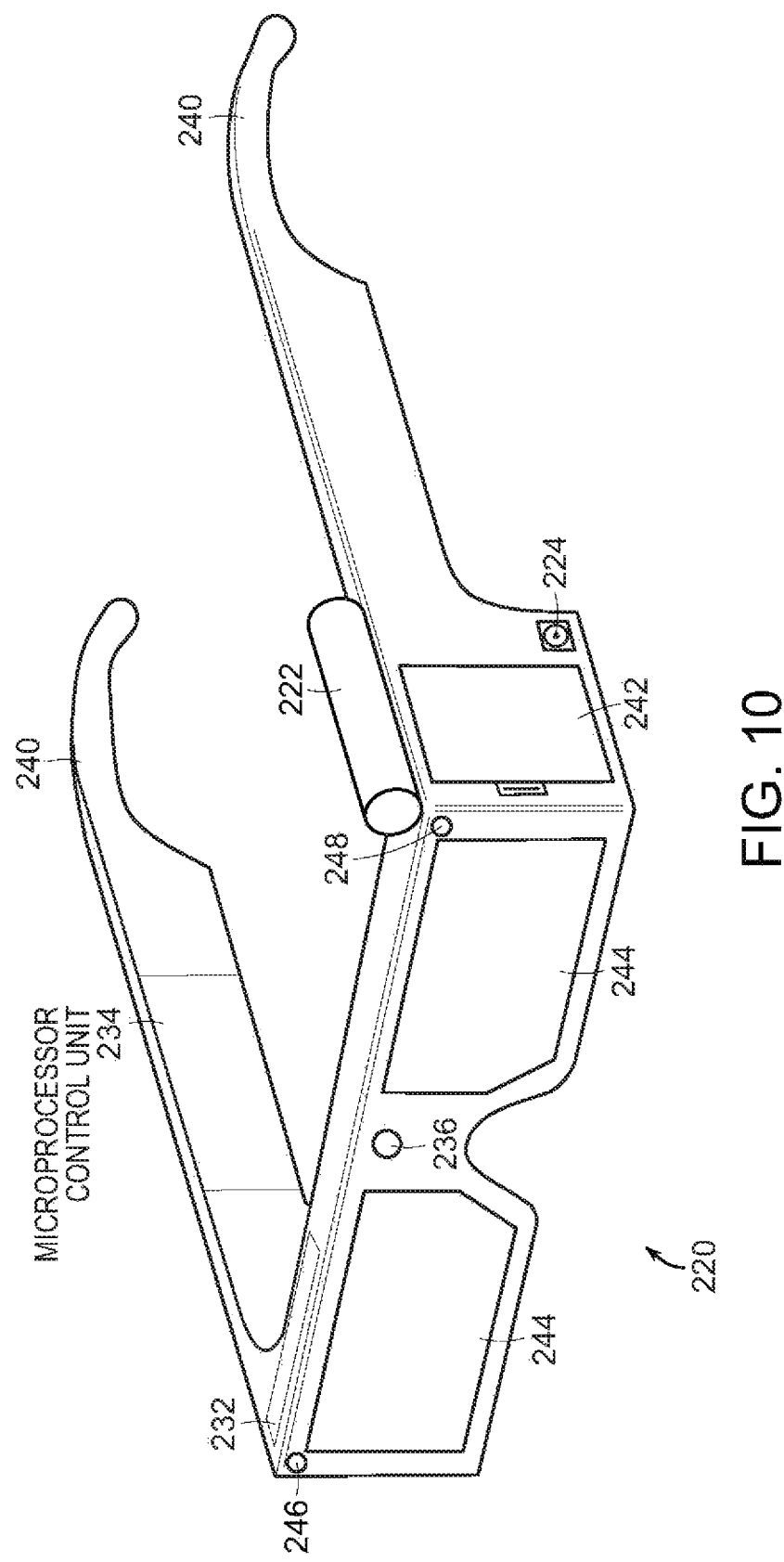
FIG. 10 is a perspective view of another mobile device of the present invention.

Portable device 220 of FIG. 10 is an alternative embodiment in the configuration of glasses or goggles and includes a GPS and patch antenna 232, microprocessor and GPU 234, camera 222, and radio 236. Controls, such as the directional pad 224, are on the side frames (opposite side not shown). In addition to or in lieu of the control pad 224, a microphone and voice commands run by processor 234, or gestural commands can be used. Batteries are stored in compartment 242. The displays are transparent LCD's as at 244. Sensors 246, 248 are preferably associated with a depth camera, such as a TOF camera, structured light camera, or LIDAR, as described herein. Alternatively both sensors might comprise a plenoptic camera. Examples of similar devices are the MyVue headset made by MicroOptical Corp. of Westwood, Mass. (see, e.g., U.S. Pat. No. 6,879,443), Vuzix Wrap 920 AR, 1200 VR, Smart Glasses M 100 and Tac-Eye LT available from Vuzix Corporation, Rochester, N.Y. A more immersive experience is available using the Occulus Rift head mounted display (HMD) available from Occulus VR of Southern California. Such immersive virtual reality HMD's are advantageous in certain applications and the terms "glasses" or "goggles" when used in the present application are meant to include such immersive HMD's.

A particular benefit of the use of wearable glasses such as the embodiment of FIG. 10 is the ability to incorporate augmented reality messages and information, e.g. point of interest overlays onto the "real" background. Of course, augmented reality can also be used with portable device 10 of FIGS. 4-9 using one or more cameras, 140, 141, 142, 143, 146 or 148. In the golf example, a golfer wearing glasses 220 can see the AR messages and course information and selectively highlight a particular message and additional information relative to that message (e.g. layup area, wind used in club selection, next best club selection, status of other golfers rounds, etc.). See, e.g. U.S. Pat. Nos. 7,002,551; 6,919,867; 7,046,214; 6,945,869; 6,903,752; 6,317,127 (herein incorporated by reference).

Another benefit of wearable glasses such as the embodiment of FIG. 10 is the ability to easily control the glasses 220 or any tethered smartphone by use of a gestural interface. That is, in addition to or as an alternative to buttons or keys on glasses 220 or the use of voice commands, gestures can be used to control operation of glasses 220. Such gestures can be recognized by any of the cameras or sensors, depending on the application. Depth cameras (such as Kinect or Claris) have proven particularly adapted for use in a gestural interface. However, conventional cameras such as RGB camera 222 have also been employed for simple gesture recognition. (See, Flutter of Mountain View, Calif.). See also, U.S. Publication Nos. 2010/0083190; 2002/0118880; 2010/0153457; 2010/0199232; and U.S. Pat. No. 7,095,401.

There are several different types of "range" or "depth" cameras that can be used in a mobile device, such as mobile devices 10, 220. Broadly speaking, depth cameras use:
Stereo triangulation
Sheet of light triangulation
Structured light
Time-of-flight
Interferometry
Coded Aperture In the present application, "depth camera" or alternatively "range camera" is sometimes used to refer to any of these types of cameras.

Figure 15:
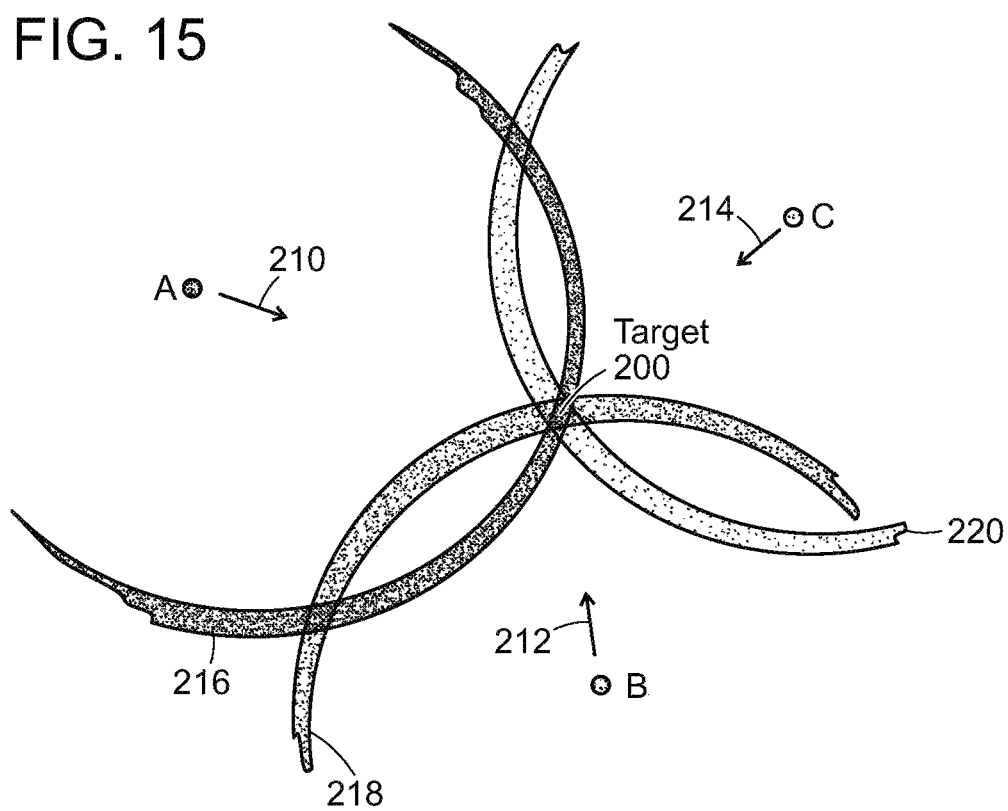
FIG. 15 is a schematic depicting three different views of a target.

While certain embodiments of the present invention can use different types of depth cameras, the use of triangulation (stereo), structured light, and time of flight (TOF) cameras are advantageous in certain embodiments discussed herein. As shown in FIG. 15, with a conventional camera, photographers at points A, B, and C are photographing a Target 200. The metadata (EXIF, FIG. 12) gives orientation and Depth of Field from each point A, B, and C. I.e. the orientations and depth of field associated with vectors from the points A, B, and C to the target in FIG. 1b. Depth of field refers to the range of distance that appears acceptably sharp, i.e. in focus. It varies depending on camera type, aperture and focusing distance, among other things. This "sharpness" or "focus" is a range, and often referred to as a circle of confusion. An acceptably sharp circle of confusion is loosely defined as one which would go unnoticed when enlarged to a standard 8×10 inch print, and observed from a standard viewing distance of about 1 foot. For digital imaging, an image is considered in focus if this blur radius is smaller than the pixel size p.

As shown in FIG. 15, the metadata greatly aids in locating the position of the target 200, and in this example, location data of Points A, B and C are known from GPS data. However, the location of the target converges to a smaller "area" as more points and images are taken of the target 200. In FIG. 15 an image is acquired from Point A along vector 210 to target 200. The area of uncertainty is denoted as arc 216. As can be seen, with images taken from Points B, C along vectors 212, 214, the location of the target converges to a small area denoted at 200.

In stereo triangulation, the present application contemplates that different cameras are used from different locations A, B, C as shown in FIG. 15. Alternatively, a single camera with 2 sensors offset from each other, such as the BumbleBee2 available from Point Grey Research Inc. of Richmond, B.C., Canada can be used to obtain depth information from a point to the target, e.g. Point A to target 200. See, U.S. Pat. Nos. 6,915,008; 7,692,684; 7,167,576.

Structured Light as a depth imaging technology has gained popularity with the introduction of the Microsoft Kinect game system (see also Asus XtionPro). A structured light imaging systems projects a known light pattern into the 3D scene, viewed by camera(s). Distortion of the projected light pattern allows computing the 3D structure imaged by the projected light pattern. Generally, the imaging system projects a known pattern (Speckles) in Near-Infrared light. A CMOS IR camera observes the scene. Calibration between the projector and camera has to be known. Projection generated by a diffuser and diffractive element of IR light. Depth is calculated by triangulation of each speckle between a virtual image (pattern) and observed pattern. Of course, a number of varieties of emittors and detectors are equally suitable, such as light patterns emitted by a MEMS laser or infrared light patterns projected by an LCD, LCOS, or DLP projector. Primesense manufactures the structured light system for Kinect and explains in greater detail its operation in WO 2007/043036 and U.S. Pat. Nos. 7,433,024; 8,050,461; 8,350,847. See also, U.S. Publication Nos. 2012/0140109; 2012/0042150; 2009/0096783; 2011/0052006, 2011/0211754. See also, U.S. Publication Nos. 2012/0056982; 2008/0079802; 2012/0307075; and U.S. Pat. Nos. 8,279,334; 6,903,745; 8,044,996 (incorporated by reference). Scanners using structured light are available from Matterport of Mountain View, Calif.

The current Kinect system uses an infrared projector, an infrared camera (detector) and an RGB camera. The current Kinect system has a Depth resolution of 640×480 pixels, an RGB resolution: 1600×1200 pixels, images at 60 FPS, has an Operation range of 0.8 m~3.5 m, spatial x/y resolution of 3 mm @2 m distance and depth z resolution of 1 cm @2 m distance. The system allows for marker less human tracking, gesture recognition, facial recognition, motion tracking. By extracting many interest points at local geodesic extrema with respect to the body centroid during the calibration stage, the system can train a classifier on depth image paths and classify anatomical landmarks (e.g. head, hands, feet) of several individuals.

New Kinect systems can obtain the same resolution at distance approaching 60 meters and accommodate more individuals and a greater number of anatomical landmarks. The new Kinect systems reportedly have a field of view of 70 degrees horizontally and 60 degrees vertically a 920× 1080 camera changing from 24-bit RGB color to 16-bit YUV. The video will stream at 30 fps. The depth resolution also improves from a 320×240 to 512×424, and it will employ an IR stream—unlike the current-gen Kinect—so the device can see better in an environment with limited light. Further, latency will be reduced by incorporating USB 3.0. Further, Primesense has recently introduced an inexpensive, small version of its sensor system that can be incorporated into mobile devices, the embedded 3D sensor, Capri 1.25. For example, in FIG. 5, sensors 146, 148 in some applications constitute emitters/receptors for a structured light system.

A time of flight (TOF) camera is a class of LIDAR and includes at least an illumination unit, lens and an image sensor. The illumination unit typically uses an IR emitter and the image sensor measures the time the light travels from the illumination unit to the object and back. The lens gathers and projects the reflected light onto the image sensor (as well as filtering out unwanted spectrum or background light.) For example, in FIG. 5, in some embodiments sensor 146 comprises an illumination sensor and senor 148 is the image sensor. Alternatively, sensors 146, 148 can operate as a part of a scanned or scannerless LIDAR system using coherent or incoherent light in other spectrums. Such TOF cameras are available from PMDVision (Camcube or Camboard), Mesa Imaging, Fotonic (C-40, C-70) or ifm. Image processing software is available from Metrilus, GmbH of Erlangen Germany.

Plenoptic Cameras can be used as any of the sensors 140-148 in FIG. 5 or 222, 246, 248 in FIG. 10. Plenoptic Cameras sample the plenoptic function and are also known as Light Field cameras and sometimes associated with computational photography. Plenoptic cameras are available from several sources, such as Lytos, Adobe, Raytrix and Pelican Imaging. See, e.g., U.S. Pat. Nos. 8,279,325; 8,289,440; 8,305,456; 8,265,478, and U.S. Publication Nos. 2008/0187305; 2012/0012748; 2011/0669189 and www.lytro.com/science_inside (all incorporated by reference).

Generally speaking, Plenoptic cameras combine a microlens array with a square aperture and a traditional image sensor (CCD or CMOS) to capture an image from multiple angles simultaneously. The captured image, which looks like hundreds or thousands of versions of the exact same scene, from slightly different angles, is then processed to derive the rays of light in the light field. The light field can then be used to regenerate an image with the desired focal point(s), or as a 3D point cloud. The software engine is complex, but many cameras include a GPU to handle such complicated digital processing.

Ideally, a plenoptic camera is about the same cost as a conventional camera, but smaller by eliminating the focus assembly. Focus can be determined by digital processing, but so can depth of field. If the main image is formed in front of the microlense array, the camera operates in the Keplerian mode; with the image formed behind the microlense array, the camera is operating in the Galilean mode. See, T. Georgieu et al, Depth of Field in Plenoptic Cameras, Eurograhics, 2009.

Figure 16A:
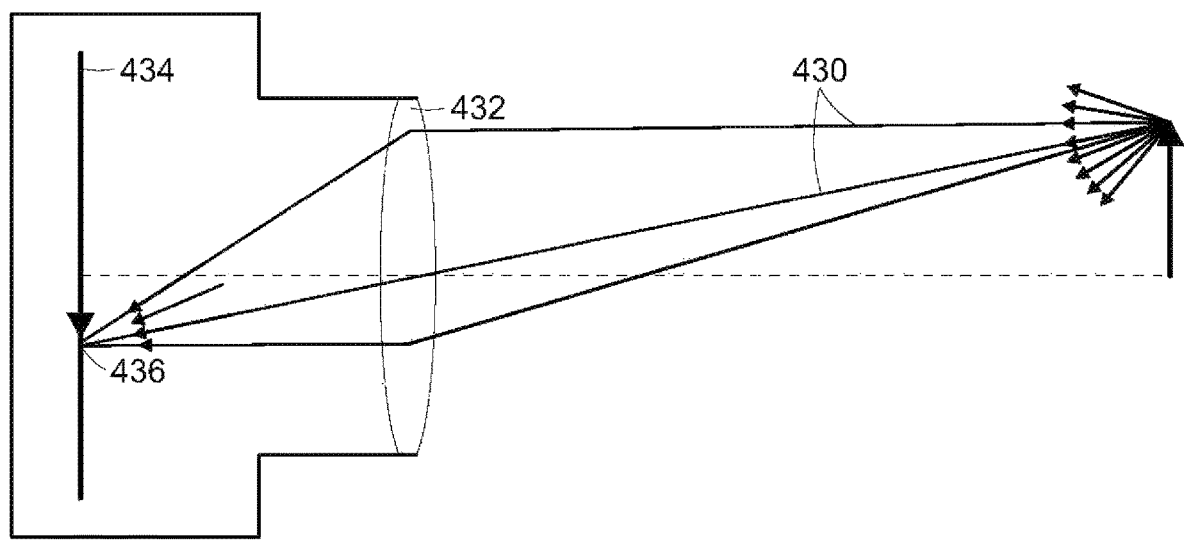
FIG. 16A illustrates a conventional camera.
Figure 16B:
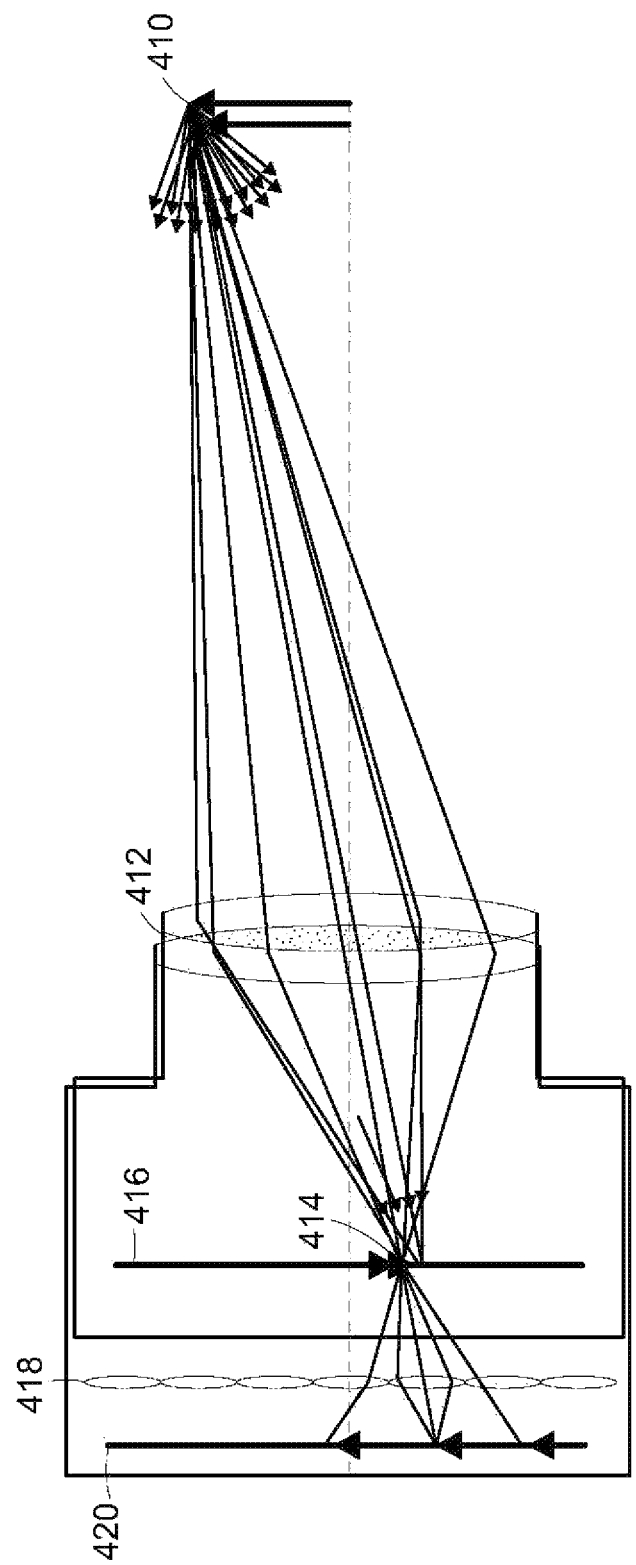
FIG. 16B illustrates the geometry of a plenoptic camera.

With conventional photography, light rays 430 pass through optical elements 432 and are captured by a sensor 434 as shown in FIG. 16A. Basically, a pixel 436 on the sensor 434 is illuminated by all of the light rays 430 and records the sum of the intensity of those rays. Information on individual light rays is lost. With Light Field photography (also referred to herein as "plenoptic"), information on all of the light rays (radiance) is captured and recorded as shown in FIG. 16B. By capturing radiance, a picture is taken "computationally." In FIG. 16B, an object 410 is imaged by a lense system 412. A virtual image 414 appears at the computational plane 416, with the images combined on the main sensor 420. The microlense array 418 has a plurality of sensors that each act as its own small camera that look at the virtual image from a different position. In some plenoptic cameras, the array might approach 20,000 microlense and even have microlense with different focal lengths giving a greater depth of field. With advances in silicon technology, the arrays can grow quite large—currently 60 MP sensors are available—and Moore's law seems to apply, meaning quite large sensor arrays are achievable to capture richer information about a scene. The computational power (e.g. GPU) to process these images is growing at the same rate to enable rendering in real time.

With computational photography, the optical elements are applied to the individual rays computationally and the scene rendered computationally. A plenoptic camera is used to capture the scene light ray information. Plenoptic cameras are available from Adobe, Lyto, Pelican Imaging of Palo Alto, Calif. In such a plenoptic camera, microlenses are used to create an array of cameras to sample the plenoptic function. Typically, the picture would be rendered by using a GPU, such as from NVIDIA (GeForce 580), programmed using CUDA or Open GL Shader Language.

Expressed another way, a light field camera combines a micro-lens array with a software engine, typically running on a GPU to create a plenoptic camera. Essentially, the micro-lens array 418 is used with a square aperture and a traditional image sensor 420 (CCD or CMOS) to capture a view of an object 410 from multiple angles simultaneously. The captured image, which looks like hundreds or thousands of versions of the exact same scene, from slightly different angles, is then processed to derive the rays of light in the light field. The light field can then be used to regenerate an image with the desired focal point(s), or as a 3D point cloud.

Therefore, in certain embodiments the use of a plenoptic camera and computational photography is believed preferable. To accurately calculate depth information in a scene with conventional cameras, two images must be compared and corresponding points matched. Depth is then extracted by triangulation as explained herein. By using plenoptic cameras and computational photography, some amount of stereo is built into the camera by using an array of microlenses. That is, the depth of field can be computed for different points in a scene.

IV. Network Operating Environment

By way of example, in FIG. 3 the communication network 205 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

By way of example, the mobile devices smart phone 10, tablet 12, glasses 220, and experience content platform 207 communicate with each other and other components of the communication network 205 using well known, new or still developing protocols. In this context, a protocol includes a set of rules defining how the network nodes within the communication network 205 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

In one embodiment, an application residing on the device 10 and an application on the content platform 207 may interact according to a client-server model, so that the application of the device 10 requests experience and/or content data from the content platform 207 on demand. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

In one embodiment, the crowdsourced random images and metadata can be used to update the images stored in a database. For example, in FIG. 3 a newly acquired image from a mobile device 10, 220 can be matched to the corresponding image in a database 212. By comparing the time (metadata, e.g. FIG. 12) of the newly acquired image with the last update to the database image, it can be determined whether the database image should be updated. That is, as images of the real world change, the images stored in the database are changed. For example if the façade of a restaurant has changed, the newly acquired image of the restaurant façade will reflect the change and update the database accordingly. In the context of FIG. 3, the Image database 212 is changed to incorporate the newly acquired image. Of course, the databases 212, 214 can be segregated as shown, or contained in a unitary file storage system or other storage methods known in the art.

In one embodiment, a location module determines the user's location by a triangulation system such as a GPS 250, assisted GPS (A-GPS) A-GPS, Cell of Origin, wireless local area network triangulation, or other location extrapolation technologies. Standard GPS and A-GPS systems can use satellites to pinpoint the location (e.g., longitude, latitude, and altitude) of the device 10. A Cell of Origin system can be used to determine the cellular tower that a cellular device 10 is synchronized with. This information provides a coarse location of the device 10 because the cellular tower can have a unique cellular identifier (cell-ID) that can be geographically mapped. The location module may also utilize multiple technologies to detect the location of the device 10. In a preferred embodiment GPS coordinates are processed using a cell network in an assisted mode (See, e.g., U.S. Pat. Nos. 7,904,096; 7,468,694; U.S. Publication No. 2009/0096667) to provide finer detail as to the location of the device 10. Alternatively, cloud based GPS location methods may prove advantageous in many embodiments by increasing accuracy and reducing power consumption. See e.g., U.S. Publication Nos. 2012/0100895; 2012/0151055. The image Processing Server 211 of FIG. 3 preferably uses the time of the image to post process the AGPS location using network differential techniques. As previously noted, the location module may be utilized to determine location coordinates for use by an application on device 10 and/or the content platform 207 or image processing server 211. And as discussed in connection with FIG. 15, increased accuracy reduces the positioning error of a target, reducing computational effort and time.

V. Data Acquisition, Conditioning and Use

Figure 13A:
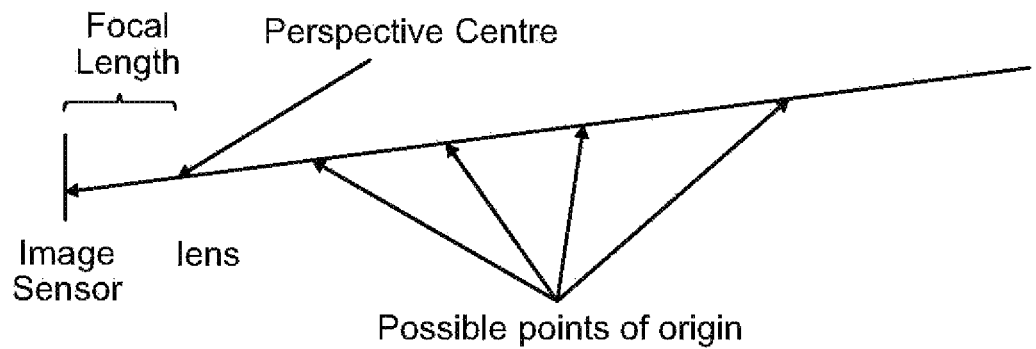
FIGS. 13a and 13b are diagrams showing Photogrammetry basic theory.
Figure 13B:
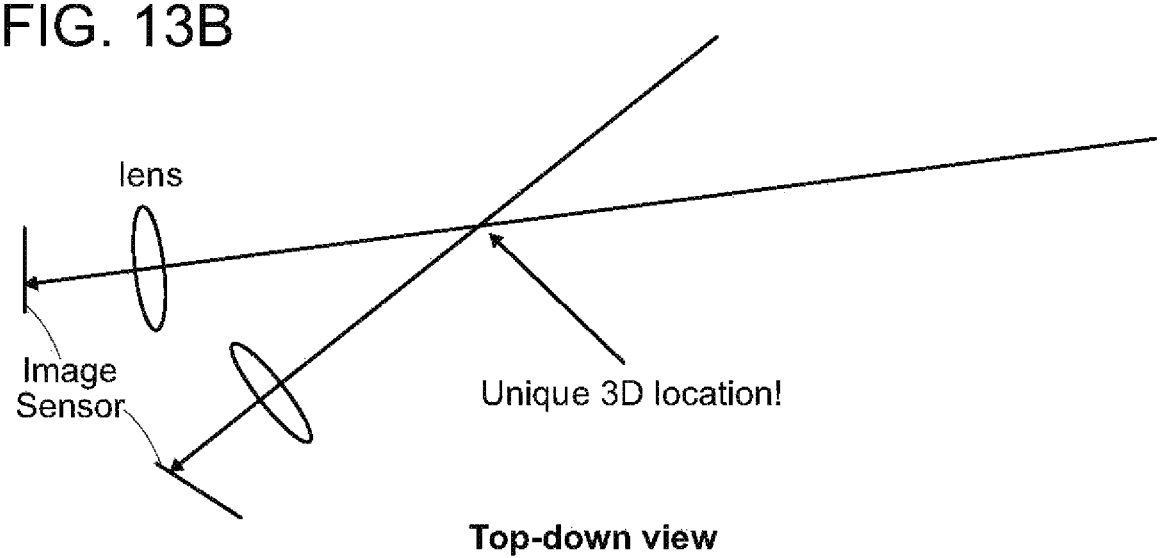

The goal is to acquire as many useful images and data to build and update models of locations. The models include both 3D virtual models and images. A basic understanding of Photogrammetry is presumed by one of ordinary skill in the art, but FIGS. 13a and 13b illustrate basic concepts and may be compared with FIG. 16A. As shown in FIG. 13a, an image sensor is used, such as the CCD or CMOS array of the mobile phone 10 of FIG. 3. Knowing the characteristics of the lens and focal length of the camera 140, 141 of the device 10 aids resolution. The device 10 has a focal length of 3.85 mm and a fixed aperture of 2.97, and an FNumber of 2.8. FIG. 12 shows a common EXIF format for another camera associated with a Casio QV-4000. When a user of the camera 140, 141 in the device 10 acquires an image, the location of the "point of origin" is indeterminate as shown in FIG. 13a, but along the vector or ray as shown. The orientation of the device 10 allows approximation of the orientation of the vector or ray. The orientation of the device 10 or 220 is determined using, for example, the digital compass, gyroscope, and even accelerometer (FIG. 6). A number of location techniques are known. See, e.g., U.S. Publication Nos. 2011/0137561; 2011/0141141; and 2010/0208057. (Although the '057 publication is more concerned with determining the position and orientation —"pose"—of a camera based on an image, the reverse use of such techniques is useful herein where the camera position and orientation are known.)

As shown in FIG. 13b, the unique 3D location of the target can be determined by taking another image from a different location and finding the point of intersection of the two rays (i.e. stereo). A preferred embodiment of the present invention makes use of Photogrammetry where users take random images of multiple targets. That is, multiple users take multiple images of a target from a number of locations. Knowing where a camera was located and its orientation when an image is captured is an important step in determining the location of a target. Aligning targets in multiple images allows for target identification as explained herein. See, e.g., U.S. Pat. No. 7,499,079.

Image alignment and image stitching is well known by those of skill in the art. Most techniques use either pixel to pixel similarities or feature based matching. See, e.g., U.S. Pat. No. 7,499,079 and U.S. Publication No. 2011/0187746; 2012/478569; 2011/0173565. For example, Microsoft has developed algorithms to blend overlapping images, even in the presence of parallax, lens distortion, scene motion and exposure differences in their "photosynch" environment. Additionally, Microsoft has developed and deployed its "Photosynth" engine which analyzes digital photographs and generates a 3D model and a point mesh of a photographed object. See, e.g., U.S. Publication Nos. 2010/0257252; 2011/0286660; 2011/0312374; 2011/0119587; 2011/0310125; and 2011/0310125. See also, U.S. Pat. Nos. 7,734,116; 8,046,691; 7,992,104; 7,991,283 and U.S. Publication No. 2009/0021576.

The photosynth engine is used in a preferred embodiment of the invention. Of course, other embodiments can use other methods known in the art for image alignment and stitching. The first step in the Photosynth process is to analyze images taken in the area of interest, such as the region near a point of interest. The analysis uses an feature point detection and matching algorithm based on the scale-invariant feature transform ("SIFT"). See, the D. Lowe SIFT method described in U.S. Pat. No. 6,711,293. Using SIFT, feature points are extracted from a set of training images and stored. A key advantage of such a method of feature point extraction transforms an image into feature vectors invariant to image translation, scaling, and rotation, and partially invariant to illumination changes and local geometric distortion. This feature matching can be used to stitch images together to form a panorama or multiple panoramas. Variations of SIFT are known to one of ordinary skill in the art: rotation-invariant generalization (RIFT); G-RIFT (Generalized RIFT); Speeded Up Robust Features ("SURF"), PCA-SIFT, and GLOH.

This feature point detection and matching step using SIFT (or known alternatives) is computationally intensive. In broad form, such feature point detection uses the photogrammetry techniques described herein. In the present invention, computation is diminished by providing very accurate positions and orientation of the cameras and using the metadata associated with each image to build the 3D point cloud (e.g. model).

The step of using the 3D model begins with downloading the Photosynth viewer from Microsoft to a client computer. The basics of such a viewer derives from the DeepZoom technology originated by Seadragon (acquired by Microsoft). See, U.S. Pat. Nos. 7,133,054 and 7,254,271 and U.S. Publication Nos. 2007/0104378; 2007/0047102; 2006/0267982; 2008/0050024; and 2007/0047101. Such viewer technology allows a user to view images from any location or orientation selected by a user, zoom in or out or pan an image.

VI. General Overview of Operation and Use

Figure 1B:
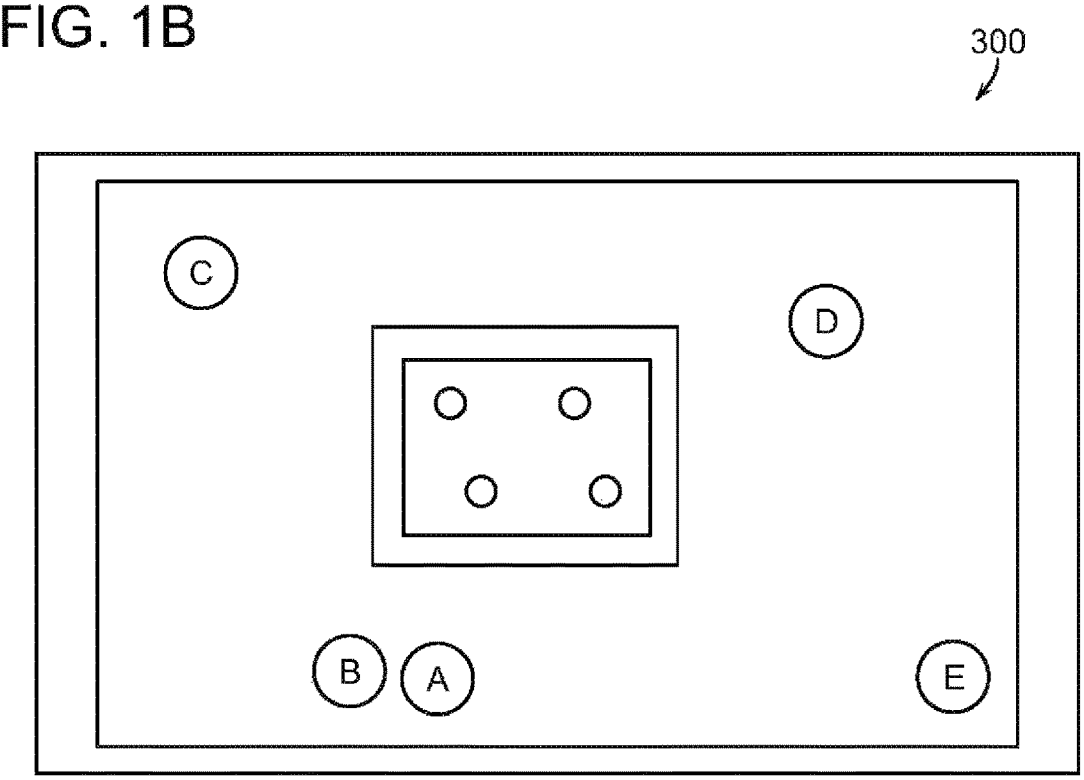

FIG. 1a shows a plaza 300 in a perspective view, while FIG. 1b is a plan view of plaza 300. As an example, a plurality of images are taken by different users in the plaza 300 at locations A-E at different times, FIG. 1b. The data acquired includes the image data (including depth camera data and audio if available) and the metadata associated with each image. While FIG. 12 illustrates the common EXIF metadata associated with an image, the present invention contemplates additional metadata associated with a device, such as available from multiple sensors, see e.g. FIGS. 5, 6, 10. In a preferred embodiment, as much information as possible is collected in addition to the EXIF data, including the data from the sensors illustrated in FIG. 6. Preferably, the make and model of the camera in the device 10 is also known, from which the focal length, lens and aperture are known. Additionally, in a preferred form the location information is not unassisted GPS, but assisted GPS acquired through the cell network which substantially increases accuracy, both horizontal and vertical. By knowing the time the image was taken and approximate location, differential corrections and post processing can also be applied to the approximate location, giving a more precise location of the image. See, e.g., U.S. Pat. Nos. 5,323,322; 7,711,480; and 7,982,667.

The data thus acquired from users at locations A-E using e.g. devices 10, 12, or 220, are collected by the image processing server 211 as shown in FIG. 3. The data is preferably conditioned by eliminating statistical outliers. Using a feature recognition algorithm, a target is identified and location determined using the photogrammetry techniques discussed above. As can be appreciated, the more precise the locations where an image is acquired (and orientation) gives a more precise determination of target locations. Additionally, a converging algorithm such as least squares is applied to progressively determine more precise locations of targets from multiple random images.

In the preferred embodiment, the camera model and ground truth registration described in R. I. Harley and A. Zisserman, *Multiple View Geometry in Computer Vision*, Cambridge University Press, 2000 is used. The algorithm for rendering the 3D point cloud in OpenGL described in A. Mastin, J. Kepner, and J. Fisher, "Automatic Registration of LIDAR and Optimal Images of Urban Scenes," IEEE 2009. See also, L. Liu, I. Stamos, G. Yu, G. Wolberg, and S. Zokai, "Multiview Geometry For Texture Mapping 2d Images onto 3d Rang Data," CVPR '06, Proceedings of the 2006 IEEE Computer Society Conference, pp. 2293-2300. In a preferred form, the LIDAR data of an image is registered with the optical image by evaluating the mutual information: e.g. mutual elevation information between LIDAR elevation of luminance in the optical image; probability of detection values (pdet) in the LIDAR point cloud and luminance in the optical image; and, the joint entropy among optical luminance, LIDAR elevation and LIDAR pdet values. The net result is the creation of a 3D model by texture mapping the registered optical images onto a mesh that is inferred on the LIDAR point cloud. As discussed herein, in lieu of, or in addition to LIDAR, other depth cameras may be used in certain embodiments, such as plenoptic cameras, TOF cameras, or structured light sensors to provide useful information.

For each point in the 3D mesh model, a precise location of the point is known, and images acquired at or near a point are available. The number of images available of course depends on the richness of the database, so for popular tourist locations, data availability is not a problem. Using image inference/feathering techniques (See U.S. Pat. No. 7,499,079) images can be extrapolated for almost any point based on a rich data set. For each point, preferably a panorama of images is stitched together and available for the point. Such a panorama constitutes a 3D representation or model of the environment from the chosen static point. Different techniques are known for producing maps and 3D models, such as a point mesh model. See e.g. U.S. Pat. No. 8,031,933; U.S. Publication Nos. 2008/0147730; and 2011/0199479. Further, the images may be acquired and stitched together to create a 3D model for an area by traversing the area and scanning the area to capture shapes and colors reflecting the scanned objects in the area visual appearance. Such scanning systems are available from Matterport of Mountain View, Calif., which include both conventional images and structured light data acquired in a 360' area around the scanner. A 3D model of an area can be created by scanning an area from a number of points creating a series of panoramas. Each panorama is a 3D model consisting of images stitched to form a mosaic, along with the 3D depth information (from the depth camera) and associated metadata. In other words, traversing an area near a point of interest and scanning and collecting images over multiple points creates a high fidelity 3D model of the area near the point of interest.

Georeferenced 3D models are known, with the most common being Digital Surface Models where the model represents the earth's terrain with at least some of the surface objects on it (e.g. buildings, streets, etc.). Those in the art sometimes refer to Digital Elevation Models (DEM's), with subsets of Digital Surface Models and Digital Terrain Models. FIG. 11 shows the earth's surface with objects displayed at various levels of detail, and illustrates a possible georeference of plaza 300 in an urban environment. LIDAR is often used to capture the objects in georeference to the earth's surface. See, BLOM3D at http://www.blomasa.com.

Figure 11A:
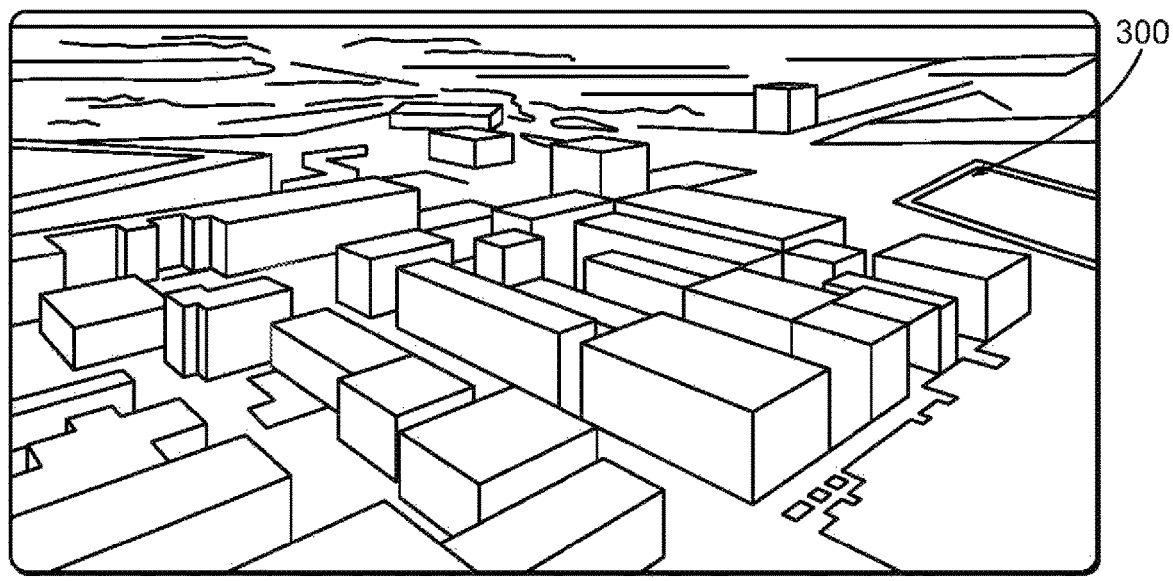
FIG. 11A is a perspective, aerial view of a portion of a city where a low resolution wire frame is depicted.

FIG. 11a is a wire frame block model in an urban environment where the 3D buildings are represented as parallelogram blocks, with no information on roofs or additional structures. This is the simplest data model.

Figure 11B:
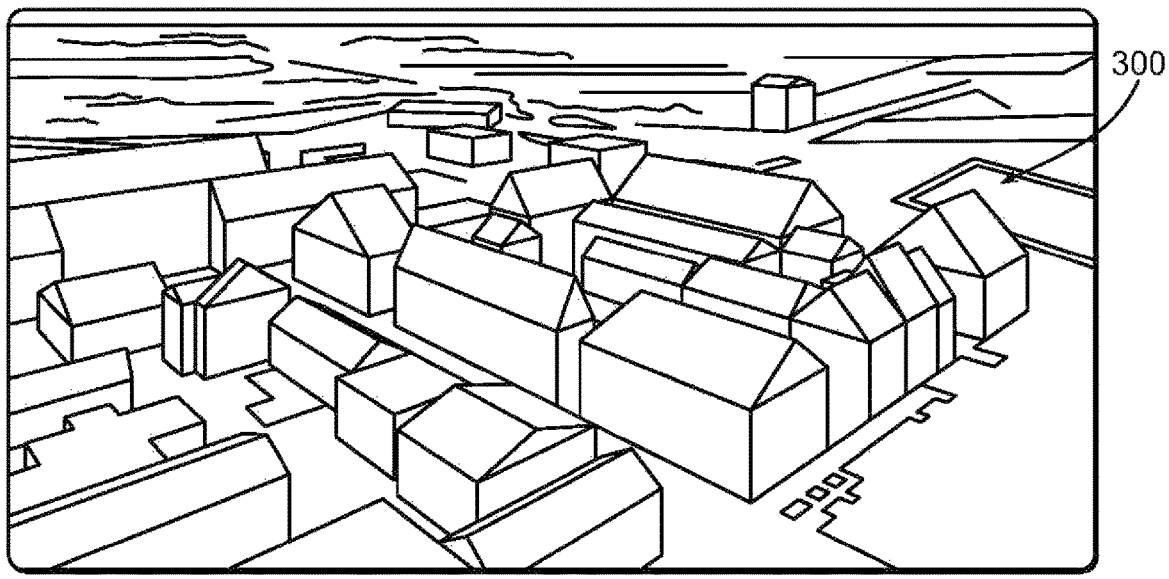
FIG. 11B is a perspective, aerial view of the same portion of a city where a refined resolution is depicted.

FIG. 11b is a RoofTop Model that adds roof structure and other constructions present on the buildings. This is a much more detailed and precise model and may include color.

Figure 11C:
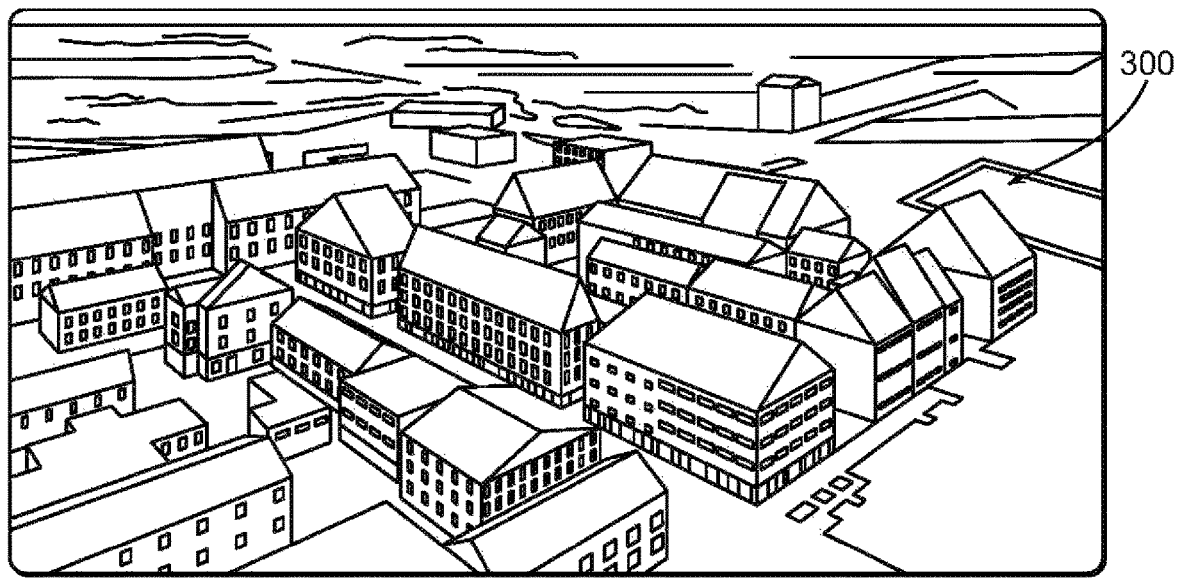
FIG. 11C is a perspective, aerial view of the same portion of a city where a detailed resolution is depicted.

FIG. 11c is a Library Texture Model adds library textures have been to the Rooftop model of FIG. 11b. The result is a closer approximation of reality, with a smaller volume of data than a photo-realistic model, which makes it ideal for on-board or navigation applications in which the volume of data is a limitation.

Figure 11D:
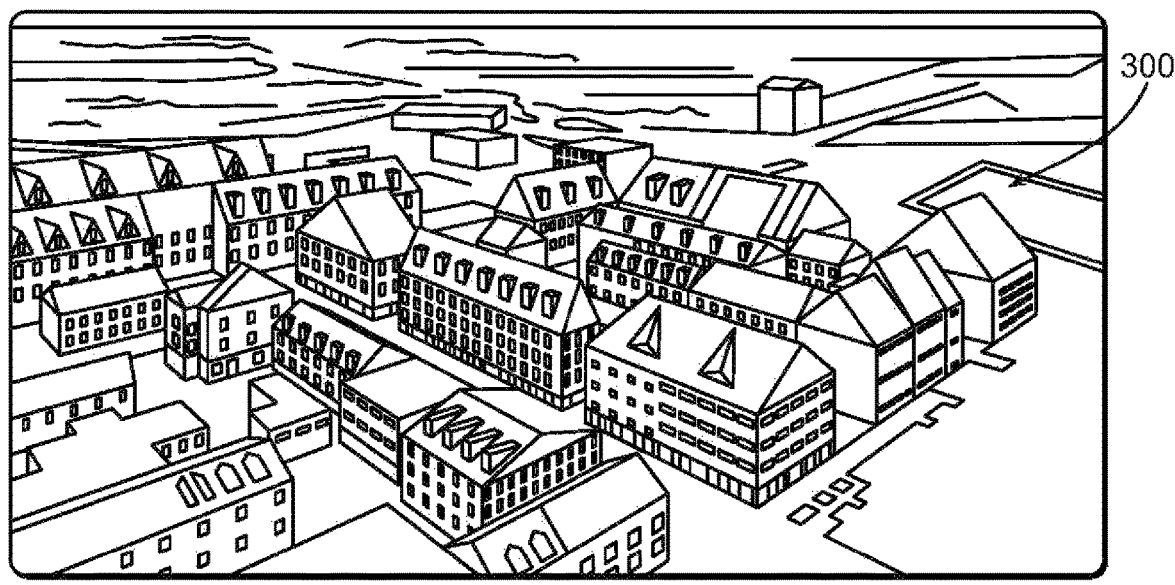
FIG. 11D is a perspective, aerial view of the same portion of a city where a fine, photorealistic resolution is depicted.

FIG. 11d is a Photo-realistic Texture Model that adds building textures to the Rooftop model of FIG. 11b. The textures are extracted from the imagery, metadata and LIDAR information.

On top of any of the 3D models of FIG. 11 can be layered additional information in even greater detail. The greater the detail (i.e. higher fidelity), the closer the model approximates photorealistic. That is, the 3D virtual model becomes realistic to an observer. The tradeoff, of course, is having to handle and manipulate large data sets. Each model has its application in the context of the system and methods of the present invention. Any reference to a "3D model" when used in the present application should not imply any restrictions on the level of detail of the model.

Figure 14:
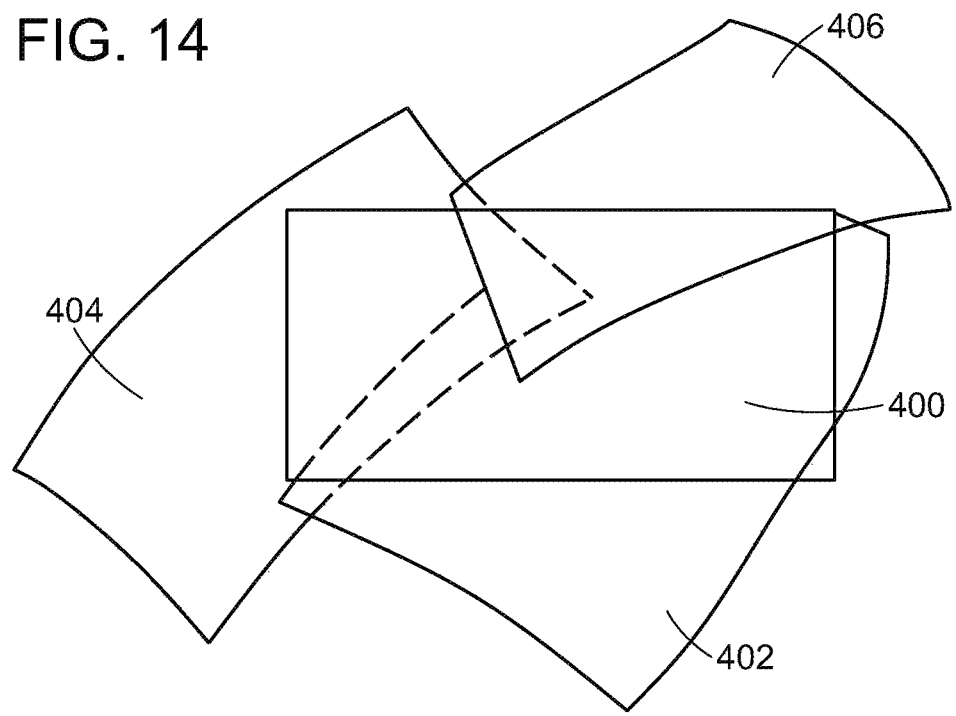
FIG. 14 is a schematic depicting image alignment and registration.

FIG. 14 is a schematic to illustrate the process of image alignment and stitching, where mosaic 400 is the result of using images 402, 404, and 406. Comparing FIG. 1b and FIG. 14, the assumption is that images 402, 404, 406 correspond to images taken from locations A, B and D respectively. The line of sight (i.e. the vector or ray orientation from a camera position) for each image 402, 404, 406 is used and described in a coordinate system, such as a Cartesian or Euler coordinate system. The region of overlap of the images defines a volume at their intersection, which depends on the accuracy of the locations and orientations of the cameras (i.e. pose) and the geometry of the images. However, the search space for feature recognition is within the volume, e.g. for applying the photosynth technique described herein. The contributions from each image 402, 404, 406 are used to form the mosaic 400. Such mosaic construction techniques are known, such as U.S. Pat. No. 7,499,079. The boundaries are "feathered" to eliminate blurring and to provide a smooth transition among pixels. Multiple mosaics can be constructed and aligned to form a panorama.

Figure 17:
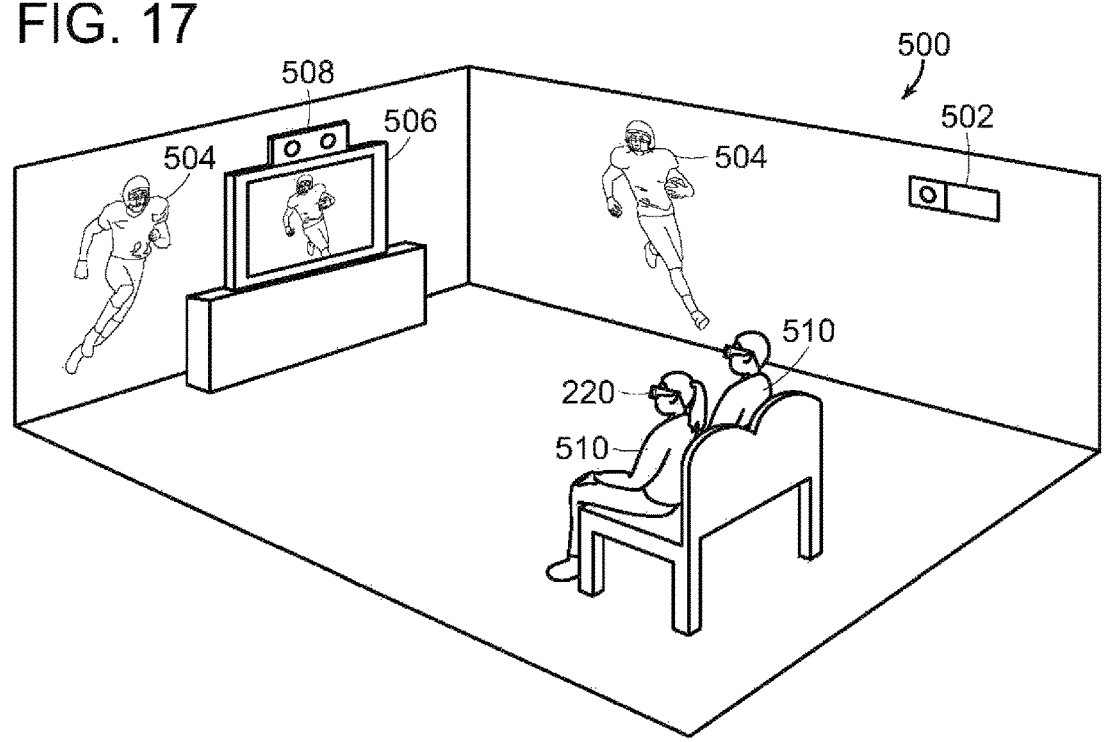
FIG. 17 is a perspective view of a room having an embodiment of an immersive environment.

Once a 3D model has been created, there exists a variety of methods for sharing and experiencing the environment created. FIG. 17 illustrates one form of an experience viewing system, namely a room 500 accommodating one or more users 510, which allows an experience to be wholly or partially projected within the room. See, U.S. Publication No. 2012/0223885. In the embodiment shown in FIG. 17, a projection display device 502 is configured to project images 504 in the room 500. Preferably the projection display device 502 includes one or more projectors, such as a wide-angle RGB projector, to project images 504 on the walls of the room. In FIG. 17, the display device 502 projects secondary information (images 504) and primary display 506, such as an LCD display, displays the primary information. However, it should be understood that either display 502 or 506 can operate without the other device and display all images. Further, the positioning of the devices 502, 506 can vary; e.g. the projection device 502 can be positioned adjoining primary display 506. While the example primary display 104 and projection display device 502 shown in FIG. 17 include 2-D display devices, suitable 3-D displays may be used.

In other embodiments, users 102 may experience 3D environment created using glasses 220 (FIG. 10). In some forms the glasses 220 might comprise active shutter glasses configured to operate in synchronization with suitable alternate-frame image sequencing at primary display 506 and projection display 502.

Optionally, the room 500 may be equipped with one or more camera systems 508 which may include one or more depth camera and conventional cameras. In FIG. 17, depth camera 508 creates three-dimensional depth information for the room 500. As discussed above, in some embodiments, depth camera 500 may be configured as a time-of-flight camera configured to determine spatial distance information by calculating the difference between launch and capture times for emitted and reflected light pulses. Alternatively, in some embodiments, depth camera 508 may include a three-dimensional scanner configured to collect reflected structured light, such as light patterns emitted by a MEMS laser or infrared light patterns projected by an LCD, LCOS, or DLP projector. It will be understood that, in some embodiments, the light pulses or structured light may be emitted by any suitable light source in camera system 508. It should be readily apparent that use of depth cameras, such as Kinect systems, in camera system 508 allows for gestural input to the system. In addition, the use in camera system 508 of conventional cameras and depth camera allows for the real time capture of activity in the room 500, i.e. the creation of a 3D model of the activity of the users 510 in the room 500.

Figure 18:
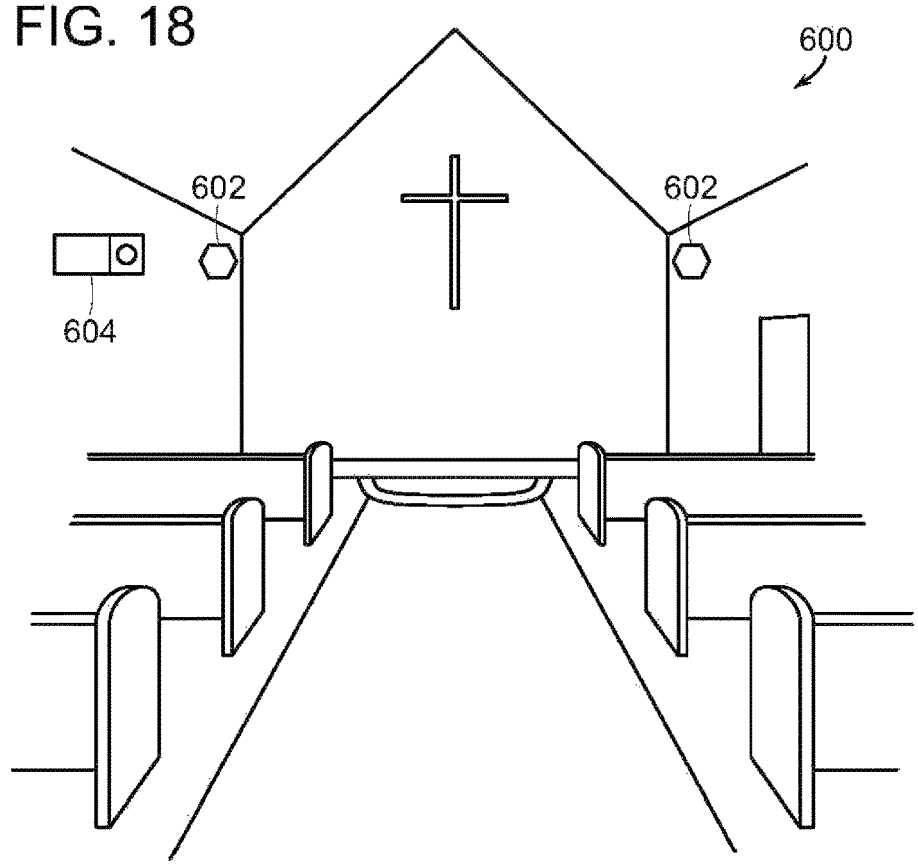
FIG. 18 is a perspective view of another room, specifically a wedding chapel, illustrating another environment.

FIG. 18 shows another room in the configuration of a wedding chapel 600. In the embodiment of FIG. 18, emphasis is on the capture of images and the building of a 3D model of the events occurring within the wedding chapel 600. In the wedding chapel 600 the use of camera systems 602 allows for the real-time capture of activity in the wedding chapel 600, i.e. the creation of a 3D model of the activity of the users in the wedding chapel 600. The camera systems 602 include a plurality of depth cameras and conventional cameras, and also microphones to capture the audio associated with the wedding. Additional microphones (not shown) can be positioned based on acoustics of the room and the event to more fully capture the audio associated with the wedding.

In a preferred form, the wedding chapel 600 has been scanned in advance of any event with a composite scanning system having both depth cameras and conventional cameras. Scans are taken at a large number of locations within the chapel 600 to increase the fidelity of the 3D model created for the chapel 600. The acquired scans are processed, i.e. by the image processing server 211 of FIG. 3 and stored in a database for later access by the experience platform 207.

During the event, i.e. the wedding, the camera systems 602 additionally capture images (and audio) of the event. Further, one or more wedding guests are accompanied with a mobile device 10, 12, or 220, to capture images and audio from the event and wirelessly convey the information to the network 205 (FIG. 3). The information captured in real-time during the event are processed at server 211 (FIG. 3) and update the databases 212, 214. The experience platform 207 is therefore accessible to observers remote from the wedding chapel 600. It will be appreciated that such remote users can experience the event (wedding) by a variety of methods, either historically or in real-time. As can be appreciated from FIG. 3 the remote observers can use mobile devices 10, 12 or 220 to observe the event. Additionally the remote observers can be present in room 500 of FIG. 17 to observe the event.

VII. Examples of Use

A few examples are useful for illustrating the operation of the system and methods hereof in a variety of contexts. It should be understood that the random images and associated metadata vary by time and space even if taken in the same general area of interest. For example, the plaza 300 may be a point of interest, but the details of the 3D model of the plaza may be unknown or outdated. Further, while the methods and systems hereof are useful outdoors where GPS is readily available, similar methods and systems can be applied indoors where location determination is more challenging, but indoor positioning systems and depth cameras can substitute for or augment GPS information. Further, in addition to collecting data associated with a general region of a point of interest, data can be segregated by time of acquisition, allowing for event recreation and participation.

1. Crowdsourcing Images: Live News Event

Figure 7:
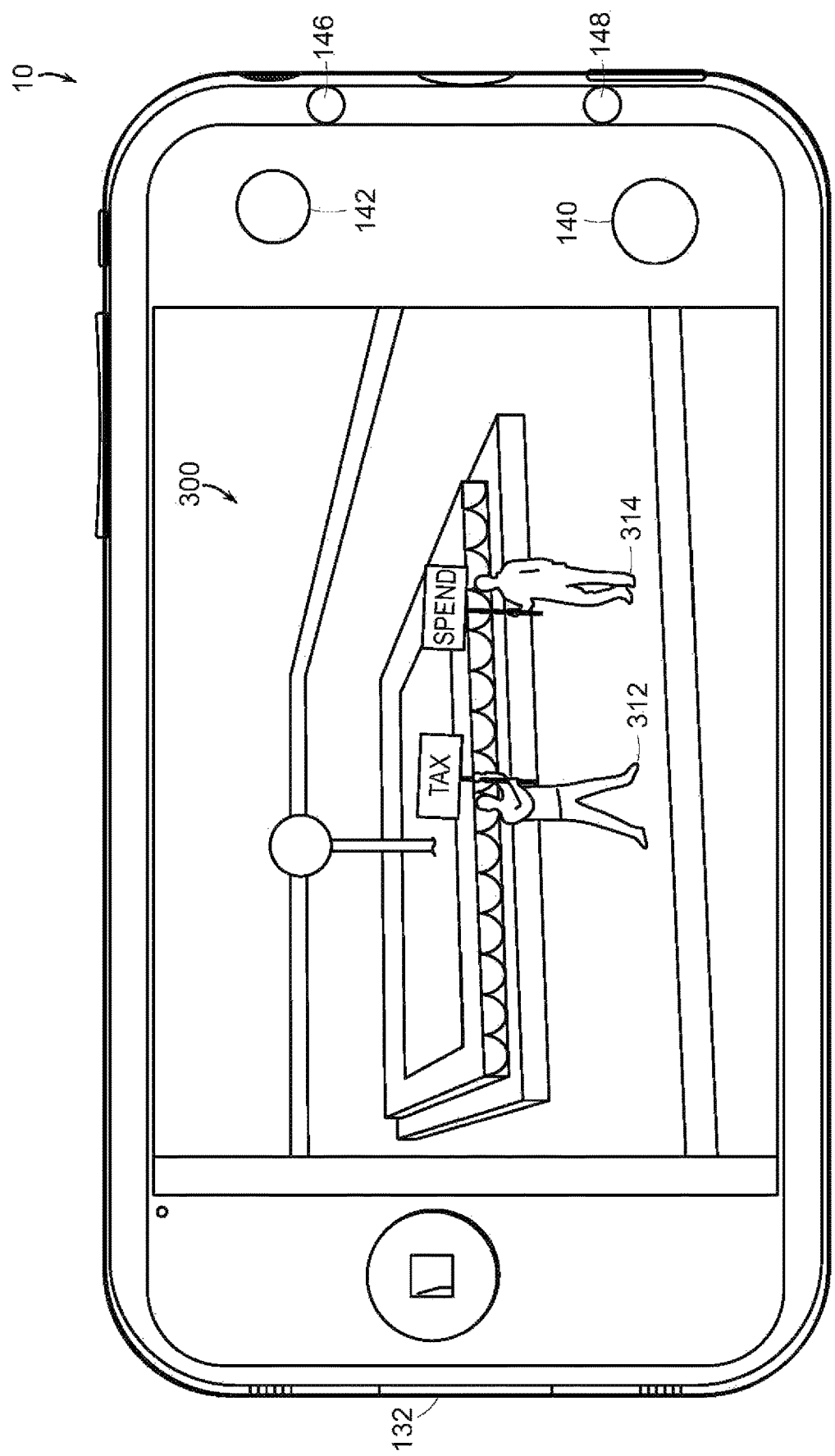
FIG. 7 is a front elevational view of the device of FIG. 2 showing a first example.

A simple example is illustrated in FIG. 7. In FIG. 7, protesters 312, 314 are imaged at the plaza 300 at a particular time (plaza 300 is also illustrated in FIGS. 1a and 1b) by observers with mobile devices, 10, 12, 220. Using multiple random images (random users and/or random locations and/or random orientations at random targets at random times) the protest demonstration (i.e. an event) can be captured and wirelessly sent to image processing server 211 via network 205 of FIG. 3. The images are processed to create or enhance a 3D model of the event (here, a protest) and stored in a database for access. The 3D model can be used by a news organization as a replay over a period of time of the demonstration. Further, a remote user can view the demonstration from any location in or near the plaza 300 upon request to the content experience platform 207. In a simple case, still pictures and video can be assembled over the time of the protest and accessed from the experience platform 207.

For example, the observers recording the protest include depth camera information, the experience platform can also include a 3D model of the plaza 300 and protesters 312, 314. This allows a remote user to select a particular viewing location in the plaza 300 from which to view the protest. Where a large number of in-person observers have captured images, the 3D model can achieve a high degree of fidelity.

Consider a more complex example of an earthquake at sea resulting in a tsunami wave that hits a major coastal city. As the wall of water wave comes ashore its sets off a chain reaction of devastating flooding across the entire city.

A cable news network issues an alert to its impacted viewers to upload captured images from smart phone/devices 10, 12 or goggles 220 to a dedicated, cloud-based server 211 using a downloaded camera phone app 108, 112 (FIG. 4). Additionally high fidelity images from prepositioned cameras, including depth cameras, throughout the city as well as aerial images are also uploaded to the server 211.

Over 10,000 impacted citizens armed with camera equipped smart phones 10 and goggles 220 from all over the city capture images (both photos and video with sound, depth information and associated metadata) of the devastation and upload them to a cloud-based server 211 (either directly or indirectly through image providers and social media). The scope of uploaded content includes both exterior images and interior images within city structures (e.g. buildings). The uploaded content can also include associated location and time specific social media content such as Twitter postings.

The news organization uses the crowd-sourced content of the event to display in near real-time a panoramic/3D rendering of the tsunami's impact along with a time lapsed rendering of the impact at a point of interest (e.g. a beach). The images, sounds and 3D model are available to subscribers/users from the experience platform 207 by using the application 106. The application 106 allows many parts of the entire (image available) city to be observed and navigated from virtually any location and point of view that the individual user desires. Not only can the user navigate the 3D model of the city, but also the user can access panorama images from many user selected locations within the model. Additionally, home users can access the 3D model using intelligent TV, but also may use the mobile devices 10, 12, 220 as a "second screen" component to augment their television or monitor feed.

Additionally, the user can also view augmented reality enhancements relevant to the particular location they are viewing using a mobile device, such as mobile device 10, 12 or 220. For example: current water depth of flooding, high water level and the status of power availability to that area.

This crowd-sourced virtual rendering of the devastation is an essential tool for both reporting the news but also managing the response effects. It also provides a living history that can be re-experienced (i.e., Walked) at a later date using an enabled mobile network display devices, smart phone 10, 12 or goggles 220 for example.

Because the live rendering of the environment has real economic value to both the news organization (audience size/advertising revenue) and the response organizations (efficient deployment of resources, protection of life & property), those that contribute to the image bank are sometimes compensated for their sharing of their content. The experience metrics of those accessing the 3D environment of the city devastation (time spent, views, actions takes, sharing, related commerce, etc.) are tracked by the app and used for analytics to inform experience optimization and related commercial activity.

2. Rendered Environment For Applying Augmented Reality Enhancements: Retail Environment—Grocery Store Every morning at the Acme Grocery Store, Bob the sales manager and members of his team walk the entire store while filming the available product using their smart phones 10 and/or googles 220. There are additional fixed cameras (such as camera systems 602, FIG. 18) throughout the store that capture and upload images every minute. The mobile devices either recognize the products directly using image recognition, or using QR codes or bar codes appearing near the available products.

Bob and team upload the images to a processing server 211 that processes/stitches the images into an updated 3D gestalt rendering of the store that can be viewed on any internet/GPS enabled device. In this example, uploading the images forces updates to popular 3rd party mapping services such as Google Maps or Bing maps, forcing the images to be current. The images also update inventory and location of the products within the store.

As customers come onto the store (or remotely if they prefer) they can walk the aisles and view freshly updated augmented reality messages about each product and associated promotional messages (pricing, specials, recipes, and/or nutritional info). The activity data (movement, time spent, AR interactions, purchases, etc.) of shoppers in the store (both in-store and/or remote) is captured and uploaded to the server for consolidation and analytics purposes.

Shoppers who experience the rendering of the store may not be dependent on using their phone's camera viewfinder. Rather, locations in the store are determined using indoor positioning technologies (discussed herein) and updated with current images of the selections.

Rather than have to annoyingly point their phone's camera at their targets to view these augmented reality messages, multiple points of view and "levels of detail" of the 3D store environment can be displayed and navigated on the customers smart phone 10 (or tablet 12 or glasses 220) without depending on the phone's camera line of sight.

Users are not required to hold their camera phone 10 in front of their face to enjoy the experience enhancements of augmented reality.

3. Mirror/Duplicate a Live Event into Another Location: Super Bowl

This year's Super Bowl is being played in the Rose Bowl in Pasadena, Calif. before a sellout crowd of 75,000 fans. The Rose Bowl has been mapped in advance, e.g. a Google Street View, where imagery, metadata and depth camera information is acquired and stored. That is, a high-fidelity 3D model of the Rose Bowl is created in advance, processed, and stored in databases 212, 214 for access via experience platform 207. The high fidelity images of the stadium, field and the participants have been uploaded to the image database 212.

The stadium had been retro-fitted with 5,000 wireless cameras (such as e.g. the camera systems 602 of FIG. 18) programmed to capture an image every 2 seconds and automatically upload these images to an image repository 216 and forwarded to a central processing server 211.

Similarly, every player's helmet is also fitted with a lightweight, wearable camera, combining a conventional camera with a depth camera and with a microphone that also captures an image every second. Referees have similar cameras mounted on the hats. Each player and coach has also been fitted with an image tag or marker to aid in augmented reality messaging. Plenoptic cameras are advantageous in some respects because of their size (no lens), weight, and power requirements.

Finally, many fans attending the game are given or already possess a wearable camera, e.g. goggles 220 (FIG. 10) that automatically captures and uploads an image from their viewpoint periodically, e.g. every 5 seconds. Any or all of the imaging and audio sensors on goggles 220 can be used. The images are continuously wirelessly uploaded and processed by the network of FIG. 3.

The high speed processing of all these crowd-sourced images and audio is then used to create a near live, virtual 3D model replicating the game that can be experienced in a number of new ways:

Projected as a mirror, live or near live 3D image and synthesized audio into another stadium/venue for viewing by another group(s) of spectators.
  With augmented reality experience enhancements
Projected as a miniaturized mirror, live or near live 3D image and synthesized audio into a home viewing "table" or conference room space.
  With augmented reality experience enhancements
On any network connected mobile device (smart phone 10, tablet 12, goggles 220 or tv) a new 3D viewing experience is enabled that allows a viewer to consume the experience from almost any perspective of their choosing in the space (any seat, any players point of view to any target or orientation, from above).
  With augmented reality experience enhancements
  Social media experience enhancements
    "50 Yard Line Seats" is a concept whereby friends who live in different locations could virtually all sit together at a 3D virtual live rendering of the game on their internet enabled TV, computer, or tablet computer. This experience would include the group video conferencing features now found in Google+'s "Huddle" so that friends could interact with each other as they all watched the game from the same perspective. For example, the friends can access social network 218 of FIG. 3 to interact with friends in a virtual environment.

In one embodiment, the game viewing experience would be made more immersive by extending the crowd-sourced image and audio environment of the game beyond the television and onto the surrounding walls and surfaces of a viewing room 500 as shown in FIG. 17. Using an the room 500 creates an immersive environment approaching the sights and sounds of attending the game in person, creating the ultimate "man cave" for "attending" events. The server could also share metadata of the weather temperature in the stadium with networked appliances (ie. HVAC) in the remote viewing structure to automatically align the temperature with that of the event.

4. Living Maps: Appalachian Trial

Figure 8:
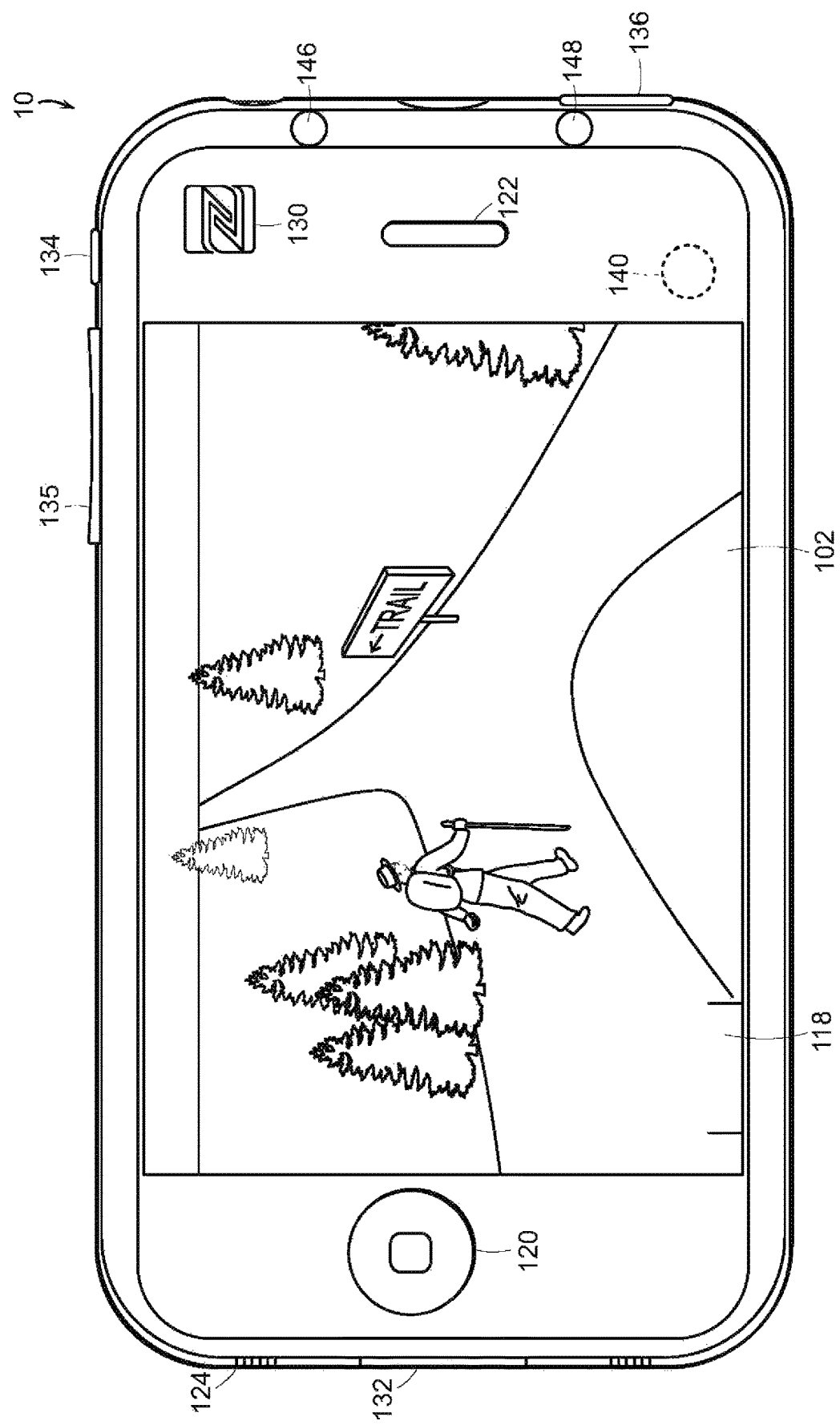
FIG. 8 is a front elevational view of the device of FIG. 2 showing a second example.

Bob is planning a hiking trip of the Appalachian Trail, FIG. 8. Using an application that accesses crowd-sourced images and models from platform 207 from hikers who have previous been on the trail, a 3D model of most of the trail is available for Bob to view in advance on his network enabled device. Further, pre-existing images and 3D models such as panoramas are also available for many locations.

He can view the 3D rendered trail environment from a number of different perspectives, locations and time periods (Fall, Winter, Spring, Summer). The rendering can also be enhanced with augmented reality type messaging about the trail including tips and messages from previous trail hikers, sometimes called "graffiti." In this example, Bob filters the images used to create the environment to be only from the last five years and limits "graffiti" to members of his hiking club that are in his social network.

Bob uses the application to chart his desired course.

Bob will be hiking the trail alone but wants to have his father John to "virtually" join him on the journey. Bob uses a social media server to invite his father and other friends to virtually join him. John accepts Bob invitation to join him which generates a notification to Bob and an event in both their calendars.

On the day of the hike Bob has with him a GPS enabled smart phone 10 or goggles 220. He launches the Appalachian Trail app, such as apps 108, 110 of FIG. 4.

The launch of the apps 108, 110 sends an alert to John that Bob's hike has started that John (and all the other friends that accepted Bob's invitation) can virtually join him.

John can access the application to join Bob's hike using his iPad 12, or goggles 220 which sends an alert to Bob's phone 10.

On John's display he is able to view several photo-realistic 3D rendering options of the environment that Bob is in as he moves along the trail, e.g. FIG. 8. For example, John has the ability to follow behind Bob, view from above in plan view John as a dot on a map, run up ahead on the trail or look behind. If fact all the activity data of virtual viewers is captured and uploaded to the server to provide analytics for optimizing the design, usage and monetization of the 3D trail environment.

Bob is able to view the same 3D trail rendering on his smart phone 10 or goggles 220 as his father John is viewing remotely. The virtual environment includes a number of "augmented reality" experience enhancements including:
  trail path
  tip/messages from other hikers (both text and audio)
  links to historical information
  historical images of the trial
  social media messages from those following his progress
  time, speed and distance performance measurements
  location and profile of others on the trial Bob is able to view this information/rendering on his phone screen and is not required to use his phone's camera lens to access AR information or trail renderings.

As Bob walks the trail he is able to have an on-going dialog with his Father John and any of the other friends who have chosen to follow Bob using a social media conferencing capability similar to Google+ Huddle. Remote viewers with properly equipped viewing rooms could make their trail viewing experience more immersive by extending the crowd-sourced image environment of the trail beyond the screen of an internet-enabled television or device and onto the surrounding walls and surfaces of the viewing room using an environmental display.

As Bob enters areas of the trail that are not robust in their image library he get an alert on his phone from the App requesting that he capture images on his phone 10 or goggles 220 and upload them to the processing server 211. Each image will contain information critical to creating the 3D environment (time/date, GPS location, orientation, camera lens information, pixel setting, etc.).

These alerts help keep the trail images library robust and current on experience platform 207.

5. Girls Night Out: Remote Sharing in a 4D Social Experience (4th is Time)

Figure 9:
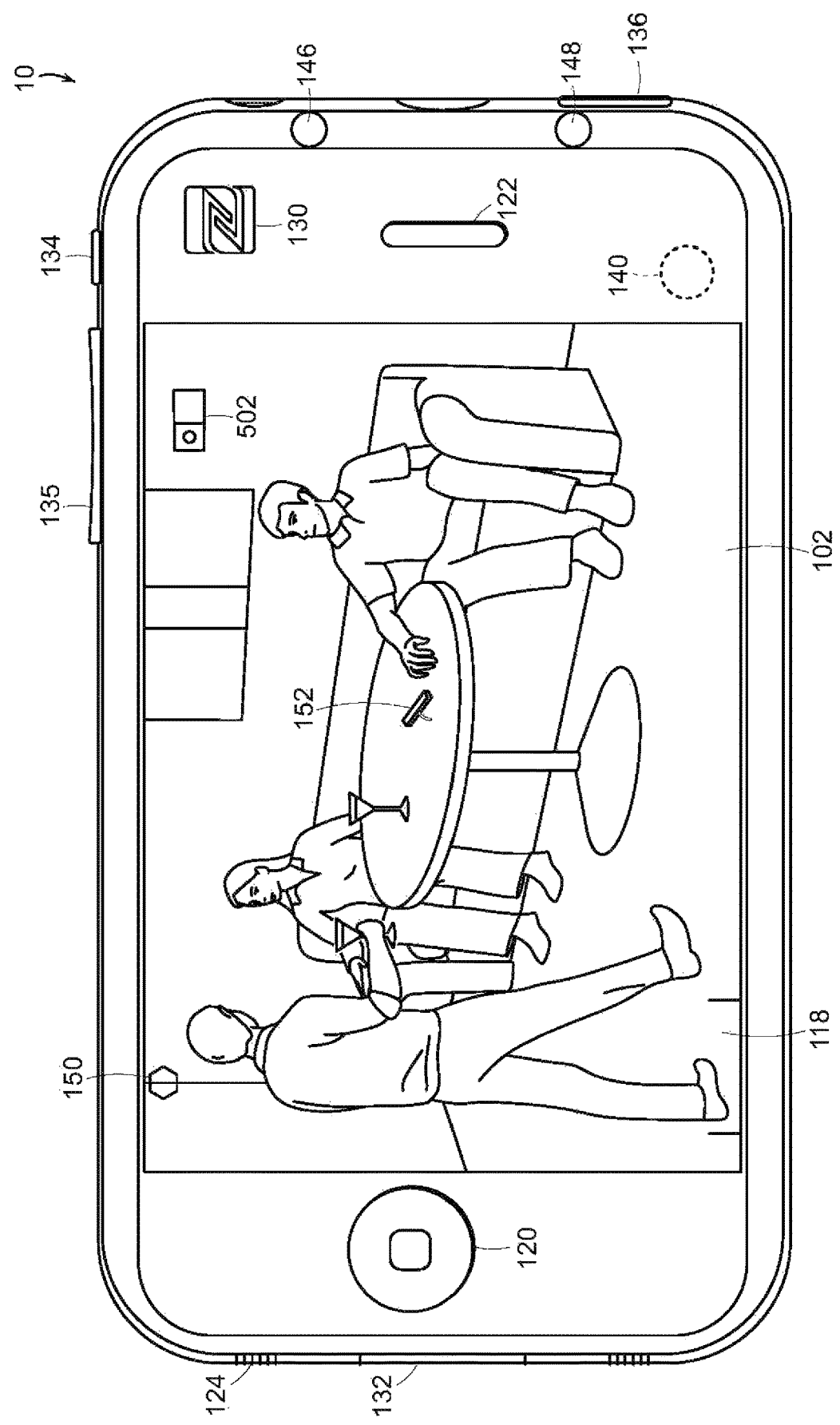
FIG. 9 is a front elevational view of the device of FIG. 2 showing a third example.

Jane is getting married next month but not before several of her best girl friends take her out for a proper bachelorette party at their favorite watering hole, The X Bar, as depicted in FIG. 9.

Jane has been posting about the upcoming party on her Facebook page and several of her out of town friends have asked to be able to remotely share in the experience.

Jane goes online and creates a Watch Me event on a social network and posts the link to her Facebook page.

She identifies The X Bar as the location of the event. Like a lot of other popular venues, The X Bar has been retrofitted with audio microphones, conventional cameras, and wireless depth cameras, such as one or more camera systems 150 having a conventional camera, structured light camera (Kinect or Claris) and microphone to constantly capture audio, images and movement activity throughout the inside of the facility. Additionally, the X Bar has been scanned in advance and an existing 3D model is stored in a database (e.g. FIG. 3). The camera systems uploads images and audio in real-time to a cloud server such as server 211. The X Bar makes these images, audio and movement activity available to applications like Watch Me to help create content that drives social buzz around their facility. That is, a remote user can access the images and 3D model in real-time via experience platform 207. Historical images inside the X Bar have been uploaded previously so the X Bar environment is known and available in fine detail from platform 207. Real time images and audio from mobile devices 10, 220 accompanying the girl friends in attendance are also uploaded to server 211 and available for Jane's event. The X Bar is also equipped with projection capabilities, such as the projector 502 in FIG. 17, that allow a limited number of remote participants to be visibly present at select tables or regions of the room.

Several of Jane's girlfriends opt-in on social media to remotely share in the bachelorette party experience. Betty, one of Jane's remote friends, elects to be visibly present/projected at the event. Betty is in at a remote location that is optimized for immersive participation of remote experience, such as the room 500 of FIG. 17. By extending the crowd-sourced images and audio, the images and audio from camera systems 150, layered on an existing 3D model creates an environment of the X Bar. Use of the system of FIG. 17 by Betty extends the event experience beyond the screen of an internet-enabled television or mobile device and onto the surrounding walls and surfaces of the viewing room 500 using one or more displays.

Conversely, Betty's image and movements are also captured by the camera system 508 of FIG. 17. Betty's image and movements (ex. Hologram) are projected into X Bar using projector 502 of FIG. 9 into a pre-defined location (example wall or table seat) so her virtual presence can also be enjoyed by those physically at Jane's event.

Betty can also choose to have her projected presence augmented with virtual goods (such as jewelry and fashion accessories) and effects (such as a tan, appearance of weight loss and teeth whitening).

On the night of the bachelorette party, Jane and each of the physically present girls all use their camera equipped, smart phones 10 or goggles 220 to log into the Watch Me application, such as app 108, 110. Throughout the night from 8 pm till 11 pm they use their smart phones 10 or goggles 220 to capture images and audio of the party's festivities and wirelessly convey them to the network of FIG. 3.

The server 211 aggregates & combines all the images/video and audio captured that evening by all the linked image and audio sources; each of the girls smart phone or goggles cameras along with images provided by The X Bar's real time image feed. This data is layered on top of the already existing refined 3D model and images of the X Bar available on the experience platform 207.

Each of these crowd-sourced images has detailed metadata (time, GPS location, camera angle, lens, pixel, etc.) that is used by the application to stitch together a 4D gestalt of the party experience. That can be enhanced with additional layers of augmented reality messaging or imagery and/or audio. In addition, at least some of the mobile devices include depth cameras permitting enhanced modeling of the event.

The aggregation can be a series of photos that can be viewable from a particular location or even a user's chosen location (e.g., Jane's perspective) or preferably a 3D panorama form the user selected location.

Sue is another one of Jane's friends that opted to view the event remotely. Every 15 minutes she gets an alert generated by the Watch Me app that another aggregation sequence is ready for viewing.

On her iPad 12, Sue opts to view the sequence from Jane's location and an exemplary orientation from the selected point of view. Sue can also choose to change the point of view to an "above view" (plan view) or a view from a selected location to Jane's location.

After viewing the sequence, Sue texts Jane a "wish I was there" message. She also uses the Watch Me application to send a round of drinks to the table.

The day after the party Jane uses the Watch Me app to post a link to the entire 4D photorealistic environment of the entire bachelorette party evening to her Facebook page for sharing with her entire network. Members of the network can view the event (and hear the audio) from a selected location within the X Bar.

6. Mobile Social Gaming

Bob and three of his friends are visiting Washington D.C. and are interested in playing a new city-specific mobile "social" multiplayer game called "DC—Spy City." The game is played using internet enabled mobile phones 10, tablets 2 or googles 220 and the objective is to find and capture other players and treasure (both physical and virtual) over the actual landscape of the city.

Using crowd-sourced images of Washington D.C. and the real time GPS location of each player, a real-time 3D photo-realistic game environment is rendered for each player. Game players and local and remote game observers can individually select from various points of view for observing (above, directly behind, etc) any of the game participants using an internet connected device.

These environments can also be augmented with additional messaging to facilitate game play information and interaction.

7. Virtual Trade Show

Bill wants to attend CES the electronics industry's major trade show but his company's budget can't afford it. The CES event organizers estimate that an additional 2,000 people are like Bill and would be interested in attending the event virtually.

To facilitate that, fixed cameras have been strategically placed through the event hall and in each of the exhibitor booths and presentation rooms. Images and audio are captured using camera systems, such as systems 602 of FIG. 18, and used to create a live, 3D, photo-realistic environment from which remote attendees can virtually walk and participate in the trade show.

The event has also created a companion augmented reality application that helps integrate these virtual attendees into the trade show, allowing them to engage with actual event participants, presenters, objects in the booth and exhibitors. Additionally, each exhibitor has equipped their booth representatives with internet-based video conferencing mobile devices (ie. Goggles 220) so that they can directly interact and share files & documents with the virtual attendees that navigate to their booth. Remote participant activity data (path traveled, booths visited, time spent, files downloaded, orders place) within the virtual trade show from the virtual trade show environment is captured and shared with the server.

Bill can interact with the event remotely by positioning himself in a room, such as room 500 of FIG. 17. However, Bill elects to participate with his desktop computer by accessing the experience platform 207 of FIG. 3. From his desktop, Bill can virtually walk through the 3D model of the convention hall and interact with people and objects using artificial reality.

8. Wedding Venue

Distance and the cost of travel are often barriers to friends and family attending a wedding. To address that issue the Wedding Chapel 600 of FIG. 18 has installed a number of fixed camera systems 602 that include depth cameras, such as Kinect, along with high fidelity sound images from light field cameras (plenoptic) throughout the venue so that its optimized for live/near remote, three-dimensional viewing and experience capture.

Will and Kate are being married overseas in London and many of their close friends cannot attend the wedding but want to actively participate in the experience remotely.

Prior to the event, each of the remote viewers registers their attendance at the Wedding Chapel website and downloads an application to their internet enabled display device to manage their consumption and participation of the wedding event. The application is also integrated with invitation/rsvp attendee information so a complete record of both physical and virtual attendees is available along with their profile information (ex. relation to couple, gift, well wishes).

Will has asked his brother Harry to be his best man. Because Harry is currently stationed overseas on active military duty he will serve as Best Man remotely and projected into the experience.

During the ceremony Will is at a remote location that is optimized for immersive participation in remote experience by extending the crowd-sourced image, audio and movement environment of the Wedding Chapel beyond the screen of an internet-enabled television or display device and onto the surrounding walls and surfaces of the viewing room using an environmental display, such as the room 500 of FIG. 17. That is, during the ceremony Will can view the event via projectors 502, 506 while camera system 508 captures Will's movements, images, and audio for transmission to the network system 100.

That is, Will's image and movements are captured and projected (ex. Hologram) into a pre-defined location (ex. near the altar) within the Wedding Chapel 600 of FIG. 18 so his virtual presence can also be viewed by those physically (as well as remotely) at the wedding.

On the day of the wedding, the application notifies the remote attendees when the event is ready for viewing. Each remote viewer has the ability to watch the wedding from any number of perspective views/locations from within and outside of the wedding chapel. These views can be stationary (third row/2nd seat or over the ministers shoulder) or moving (perspective from behind the bride as she walks down the aisle) or even from the bride or groom's location.

After the ceremony the happy couple has access to a 4D gestalt (4=time) of their wedding experience that they can "re-experience" from any number of perspectives from within and outside the Wedding Chapel whenever they like, even sharing with members of their social network.

What is claimed:

1. A method to build or update a 3D model, comprising:
wirelessly collecting crowdsourced images and associated metadata captured near a point of interest with a plurality of mobile devices accompanying a number of crowdsource contributors, one or more mobile devices having a depth camera, wherein the associated metadata includes approximate location of a mobile device, an orientation of the camera, and range between the depth camera and a target at or near said point of interest;
receiving at least some of said images and associated metadata including range metadata from said mobile devices at an image processing server; and
processing at least some of the received images and associated metadata including range metadata on said image processing server to determine the location of one or more targets proximate said point of interest to build or update a 3D model near the point of interest, selecting a first image and associated metadata including range metadata from a first mobile device based at least in part on the proximity of the approximate mobile device camera location and orientation to said point of interest, selecting a second image and associated metadata including range metadata from a mobile device based at least in part on the proximity of the approximate mobile device camera location and orientation to said point of interest, determining a common target in the first and second images, determining a first location of said common target in the 3D model using at least in part said associated metadata including range metadata from said first and second image, said range metadata including range between a mobile device depth camera and said common target.

2. The method of claim 1, at least some of said mobile devices comprising a depth camera having two or more conventional cameras in a stereo triangulation.

3. The method of claim 1, the depth camera comprising a time of flight camera, a structured light sensor, a stereo triangulation or a light field camera.

4. The method of claim 1, wherein said processing step includes using an existing 3D model proximate the common target and updating said existing 3D model using said first location of said common target.

5. The method of claim 1, including inserting a message into said 3D model at a geo-referenced position relative to the common target first location.

6. The method of claim 1, selecting a third image having associated metadata including range metadata from a mobile device to said common target, identifying said common target in the third image, and determining a second location of said common target in the 3D model using range metadata from said mobile device to said common target.

7. A system for developing a 3D model for use in artificial reality comprising:
a network for wirelessly receiving images and metadata from a plurality of mobile devices at least some having a camera to capture images and associated metadata near a point of interest, wherein the metadata for each image includes approximate location of the mobile device and the approximate orientation of the camera, at least some of said mobile devices including a depth camera capturing range metadata between the depth camera and targets at or near said point of interest,
an image processing server connected to the network for receiving said images and metadata, wherein the server processes the images and metadata to develop a 3D model of one or more targets proximate the point of interest based at least in part on images and range metadata from said depth camera,
the image processing server being operable to select a first image and associated metadata including range proximate to the point of interest using the approximate location of a first mobile device and the orientation of a first camera associated with said first image,
the image processing server being operable to select a second image and associated metadata including range proximate to the point of interest using the approximate location of a second mobile device and the orientation of a camera associated with said second image, and
said 3D model comprising the geo-referenced location of a number of said targets near said point of interest where target location is based at least in part on mobile device approximate location and range metadata from said depth camera.

8. The system of claim 7 wherein the images are crowdsourced at random from users of the mobile devices.

9. The system of claim 7, including an experience platform having said 3D model near the point of interest and a user connected to the experience platform can view targets associated with a user selected location and orientation.

10. The system of claim 7, wherein the image processing server is operable to stitch a number of images together to form a panorama.

11. The system of claim 7, the mobile device approximate location metadata comprising GPS, Wi-Fi, Cell ID, repeater, or RSS information.

12. The system of claim 7, wherein said 3D model comprises a mesh having a number of feature points and some of said geo-referenced targets serving as feature points in said mesh.

13. The system of claim 7, including devices having a depth sensor in fixed locations proximate said point of interest.

14. The system of claim 7, wherein some of the mobile devices including a depth camera incorporated into glasses worn by a mobile user.

15. The system of claim 7, the metadata including time of image acquisition and said first and second images are selected based at least in part on time of image acquisition.

16. The system of claim 7, said time of image acquisition being about the time of an event near the point of interest.

17. The system of claim 7, at least some of the mobile devices including a light field camera for capturing at least a portion of a light field proximate the mobile device location and orientation.

18. The system of claim 7, at least some of the mobile devices being operable to insert a geo-referenced message into the 3D model at or near said point of interest.

19. A method to build or update a 3D model for use in an artificial reality application comprising:
crowdsourcing a plurality of random images and associated metadata wirelessly transmitted from a plurality of mobile devices each having a camera where the metadata includes an approximate camera location and orientation and at least some of said crowdsourced images include depth metadata;
selecting a first image and associated depth metadata including approximate range between a first mobile device and a point of interest, said selecting based at least in part on a proximity of the approximate first mobile device camera location and orientation to a point of interest;
selecting a second image and associated depth metadata including approximate range between a mobile device and a point of interest, said selecting based at least in part on a proximity of the approximate camera location and orientation to said point of interest;
processing the first and second images to—
identify one or more targets in the first and second images at or near the point of interest,
detect a target common in each image using a feature point detection and matching process;
determining a first location of said common target in a 3D model using the camera location, orientation, and depth metadata a associated with said first and second images.

20. The method of claim 19, selecting a third image from a mobile device based at least in part on a proximity of an approximate camera location and orientation to the point of interest, identifying said common target in the third image, and determining a second location of said common target in the 3D model using the camera location and orientation metadata from said first, second, and third images.

21. The method of claim 20, wherein one or more additional images are selected based on proximity of camera location and orientation and subsequent locations of said common target in the 3D model is determined.

22. The method of claim 21, applying a converging algorithm to additional images to determine more precise locations of the common target.

23. The method of claim 19, wherein the second image is acquired from the first mobile device where the second image is acquired at a first mobile device camera location different than the approximate location of the first image.

24. The method of claim 19, where in the second image is acquired from a second mobile device where the second image is acquired at a camera location different than the approximate location of the first image.

25. The method of claim 19, wherein the first location of the common target is determined using photogrammetry based on camera location, orientation, and depth metadata from said first and second images.

26. The method of claim 19, wherein a first mobile device includes a depth camera and the first location of the common target is determined using at least in part a range between the depth camera of the first mobile device and the common target.

27. The method of claim 26, the depth camera comprises a time of flight camera, a structured light sensor, a stereo triangulation or a light field camera.

28. The method of claim 19, wherein the feature point detection and matching process to detect a target common in each image comprises a SIFT or SIFT variation approach.

29. The method of claim 19, including inserting a message into said 3D model at a geo-referenced position relative to the common target location.

30. The method of claim 29, including viewing the message in the 3D model comprising an advertisement based on context.

31. The method of claim 19, including updating a preexisting 3D model using said common target location.

32. The method of claim 19, wherein some of the images are randomly captured by crowdsource from users equipped with mobile devices, with the images captured about the same time to build or update a 3D model representative of an approximate time.

33. The method of claim 19, one of the mobile devise includes a light field camera for capturing a light field near the common target.

* * * * *